US006575218B1

(12) United States Patent
Burns et al.

(10) Patent No.: US 6,575,218 B1
(45) Date of Patent: Jun. 10, 2003

(54) METHOD AND APPARATUS FOR AUTOMATIC FABRICATION OF THREE DIMENSIONAL OBJECT

(76) Inventors: Marshall Burns, 10911 Weyburn Ave., Suite 332, Los Angeles, CA (US) 90024; Kenneth J. Hayworth, 18518 Chatsworth St., Northridge, CA (US) 91326; Kim F. McGinnis, 1501 S. Charing, Springfield, MO (US) 65804

(*) Notice: Subject to any disclaimer, the term of this patent is extended or adjusted under 35 U.S.C. 154(b) by 0 days.

(21) Appl. No.: 09/241,820

(22) Filed: Feb. 1, 1999

Related U.S. Application Data

(60) Division of application No. 08/640,549, filed on May 2, 1996, now Pat. No. 5,879,489, which is a continuation-in-part of application No. 08/157,645, filed on Nov. 24, 1993, now Pat. No. 5,514,232.

(51) Int. Cl.[7] .............................................. B32B 31/00
(52) U.S. Cl. ..................... 156/512; 156/517; 156/563; 156/584; 156/264; 156/248; 156/257; 156/268; 156/344
(58) Field of Search ................................ 156/230, 234, 156/235, 247, 248, 249, 257, 268, 344, 362, 516, 517, 540, 563, 566, 584, 58, 59, 64, 512, 264; 83/154

(56) References Cited

U.S. PATENT DOCUMENTS

| | | | |
|---|---|---|---|
| 2,015,457 A | | 9/1935 | Morioka |
| 3,866,052 A | | 2/1975 | Di Matteo |
| 3,877,353 A | * | 4/1975 | Smith et al. ................. 93/36 A |
| 3,932,923 A | | 1/1976 | Di Matteo |
| 3,996,990 A | | 12/1976 | Di Matteo |
| 4,001,069 A | | 1/1977 | Di Matteo |
| 4,285,754 A | | 8/1981 | Di Matteo |
| 4,292,724 A | | 10/1981 | Di Matteo |
| 4,328,057 A | * | 5/1982 | Gutow ....................... 156/248 |
| 4,575,330 A | | 3/1986 | Hull |
| 4,665,492 A | | 5/1987 | Masters |
| 4,752,352 A | | 6/1988 | Feygin |
| 4,863,538 A | | 9/1989 | Deckard |
| 4,959,115 A | | 9/1990 | Lacy |
| 5,015,312 A | | 5/1991 | Kinzie |
| 5,071,503 A | | 12/1991 | Berman |

(List continued on next page.)

FOREIGN PATENT DOCUMENTS

JP  5-338040  * 12/1993

OTHER PUBLICATIONS

PCT/SE89/00437, Ralf Larson, Filed Aug. 18, 1989.
PCT/SE90/00136, Ralf Larson, Filed Feb. 28, 1990.
PCT/SE91/00597, Ralf Larson, Filed Sep. 10, 1991.

*Primary Examiner*—Linda Gray
(74) *Attorney, Agent, or Firm*—John J. Connors; Connors & Assoc. Inc.

(57) ABSTRACT

A method and apparatus automatically fabricates a three dimensional object from individual layers of fabrication material having a predetermined configuration. Successive layers are stacked in a predetermined sequence and affixed together to form the object. The fabrication material is carried on a substrate to a stacker. At the stacker the layers are stacked together, with each layer being successively affixed to the stack of previously affixed layers, and with the substrate removed from each layer after it is affixed.

23 Claims, 19 Drawing Sheets

U.S. PATENT DOCUMENTS

| | | |
|---|---|---|
| 5,088,047 A | 2/1992 | Bynum |
| 5,094,935 A | 3/1992 | Vassiliou |
| 5,096,530 A | 3/1992 | Cohen |
| 5,121,329 A | 6/1992 | Crump |
| 5,135,379 A | 8/1992 | Fudim |
| 5,171,490 A | 12/1992 | Fudim |
| 5,174,843 A | 12/1992 | Natter |
| 5,181,444 A * | 1/1993 | Bassett .................. 83/154 |
| 5,183,598 A | 2/1993 | Helle et al. |
| 5,192,559 A | 3/1993 | Hull |
| 5,348,693 A | 9/1994 | Taylor et al. |
| 5,352,310 A | 10/1994 | Natter |
| 5,354,414 A | 10/1994 | Feygin |
| 5,397,415 A * | 3/1995 | Manabe et al. .......... 156/234 |
| 5,433,280 A | 7/1995 | Smith |
| 5,514,519 A | 5/1996 | Neckers |
| 5,518,060 A | 5/1996 | Cleary et al. |
| 5,544,550 A | 8/1996 | Smith |
| 5,578,155 A | 11/1996 | Kawaguchi |
| 5,583,973 A | 12/1996 | DeLisi et al. |
| 5,593,531 A | 1/1997 | Penn |
| 5,607,540 A | 3/1997 | Onishi |
| 5,611,880 A | 3/1997 | Onishi |
| 5,637,169 A | 6/1997 | Hull et al. |
| 5,637,175 A | 6/1997 | Feygin et al. |
| 5,663,883 A | 9/1997 | Thomas et al. |
| 5,677,107 A | 10/1997 | Neckers |
| 5,730,817 A | 3/1998 | Feygin et al. |
| 5,779,833 A | 7/1998 | Cawley et al. |
| 5,793,015 A | 8/1998 | Walczyk |
| 5,818,718 A | 10/1998 | Thomas et al. |
| 5,819,388 A | 10/1998 | Salm |
| 5,876,550 A | 3/1999 | Feygin et al. |
| 5,879,489 A | 3/1999 | Burns et al. |
| 6,146,487 A * | 11/2000 | Lee et al. .................. 156/268 |

\* cited by examiner

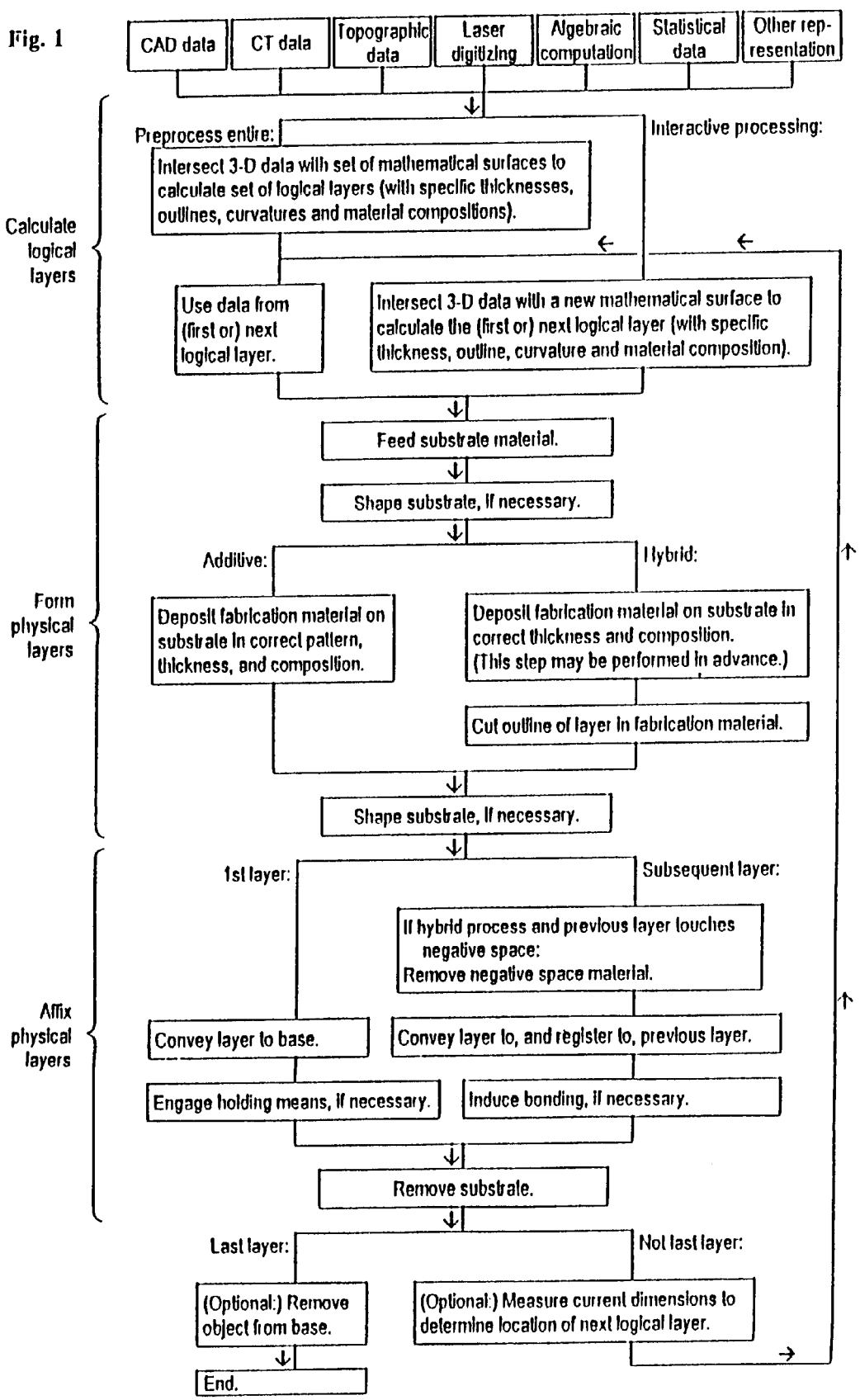

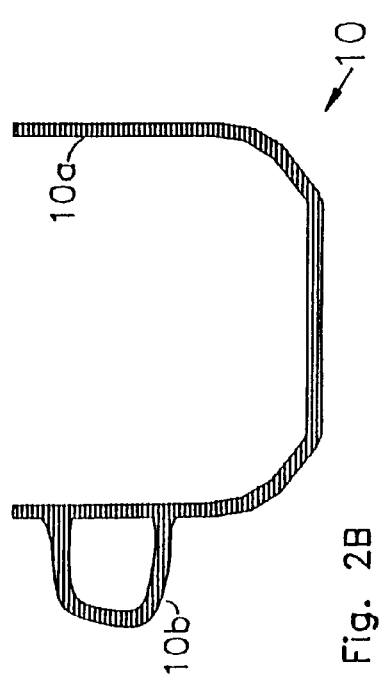
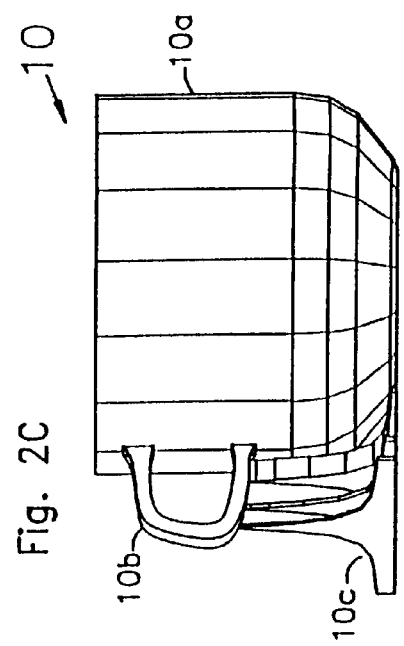
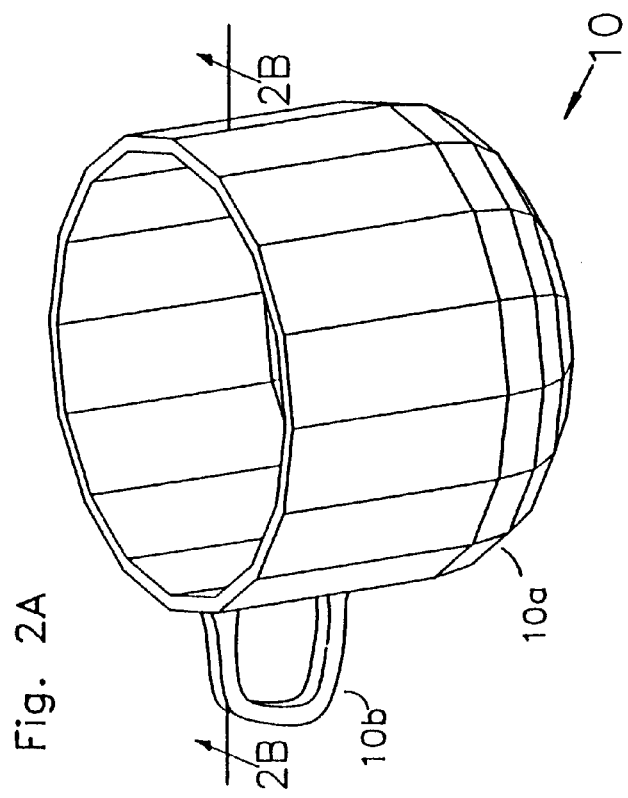

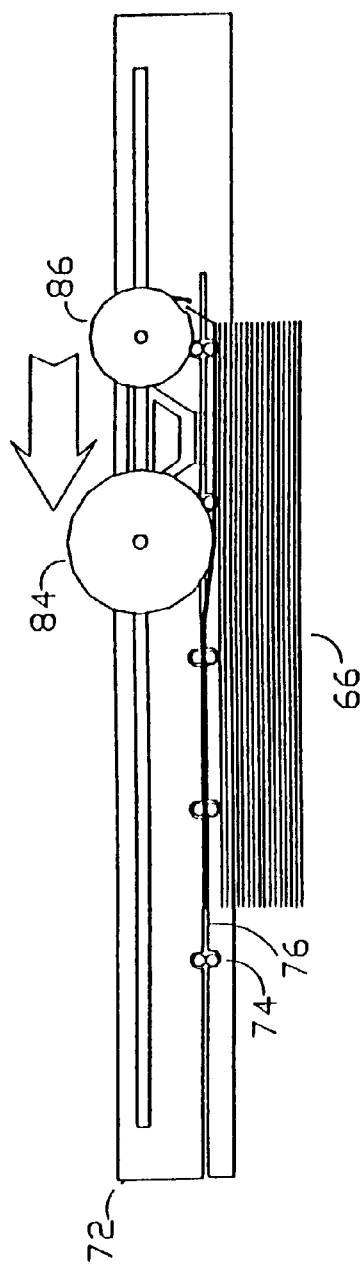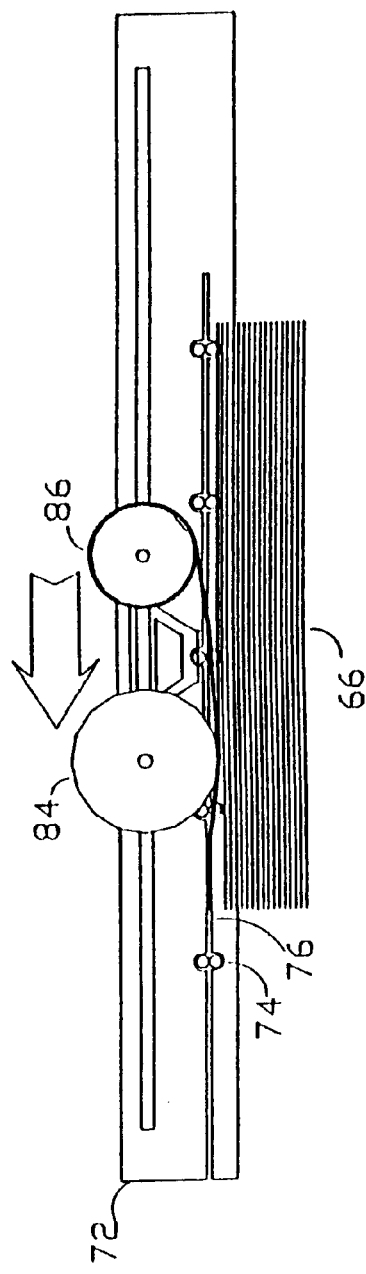
Fig. 6C(b)
Fig. 6C(c)

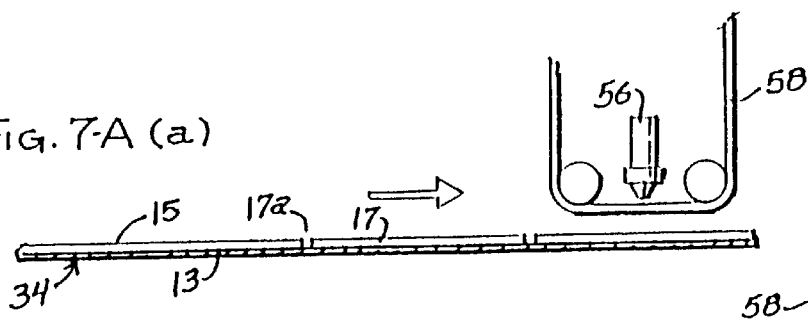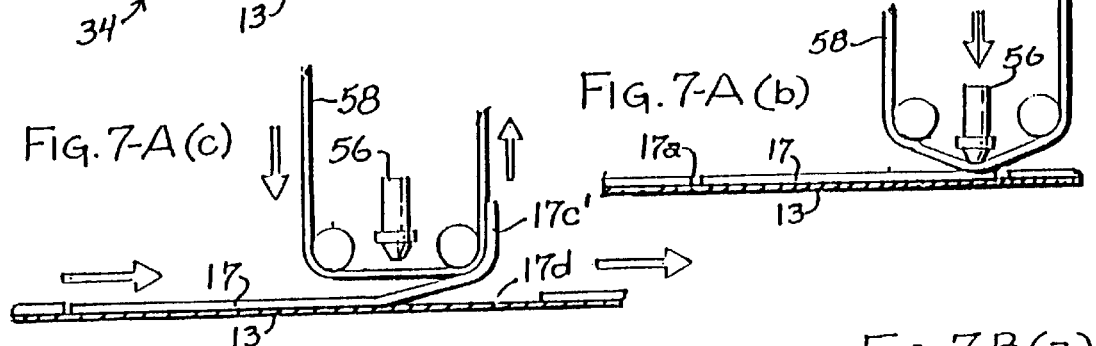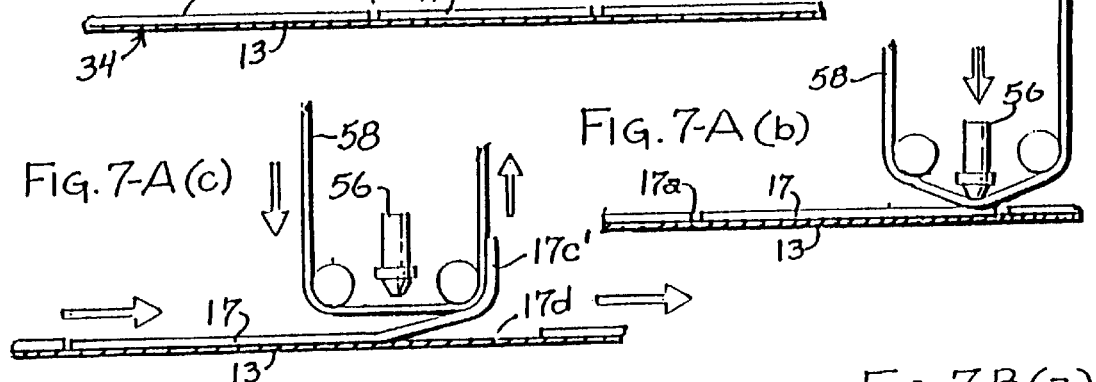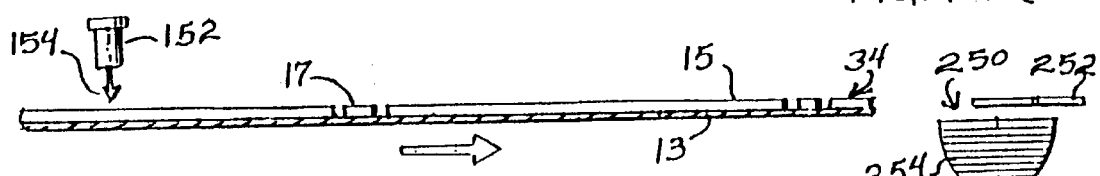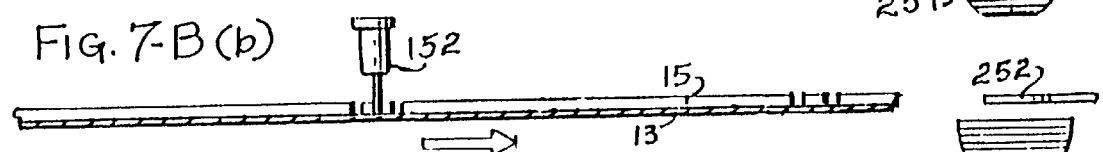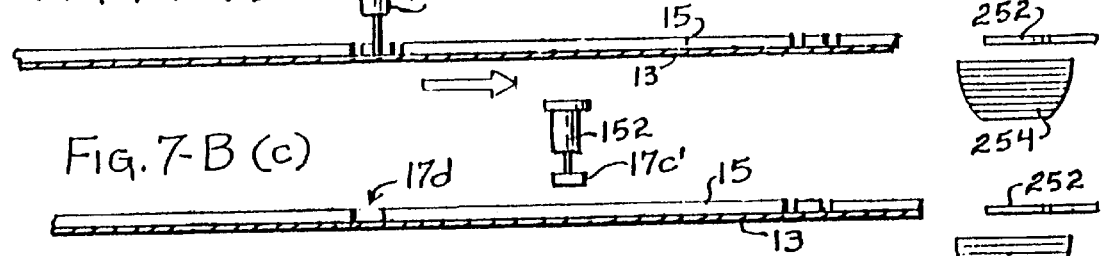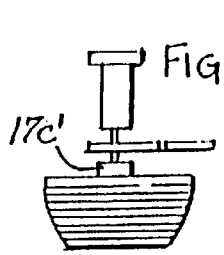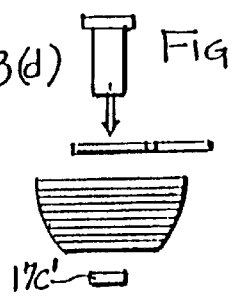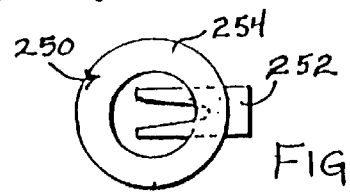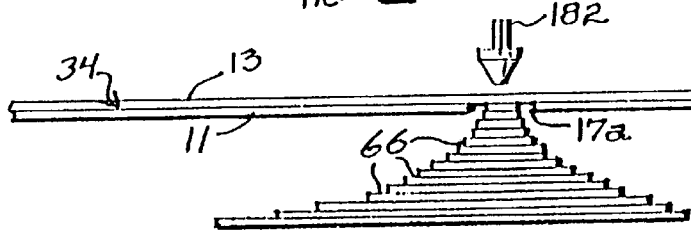

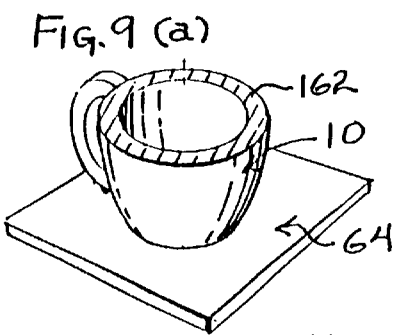
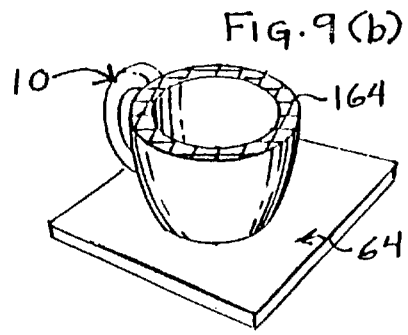
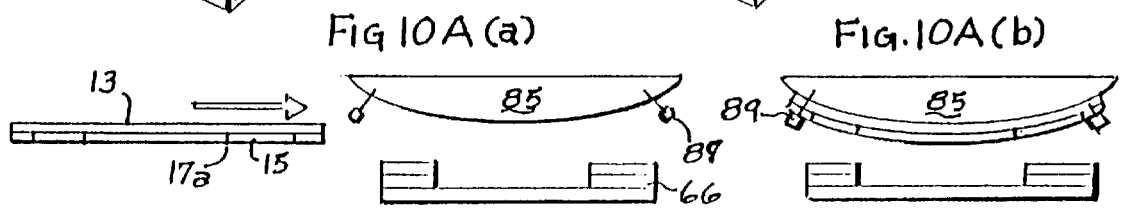
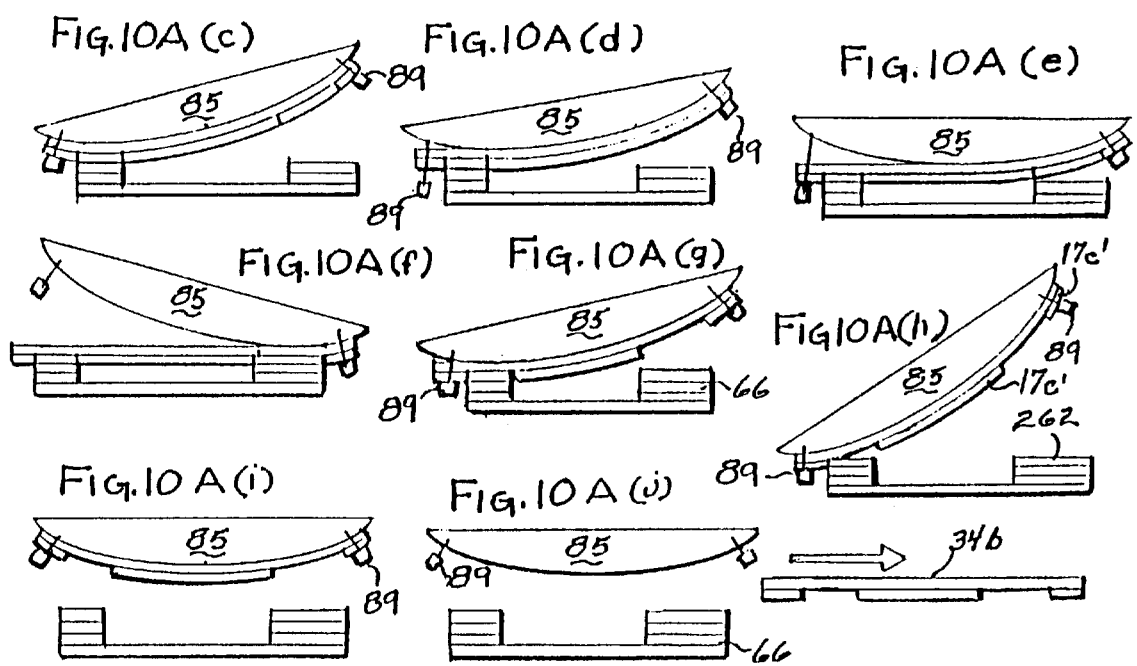

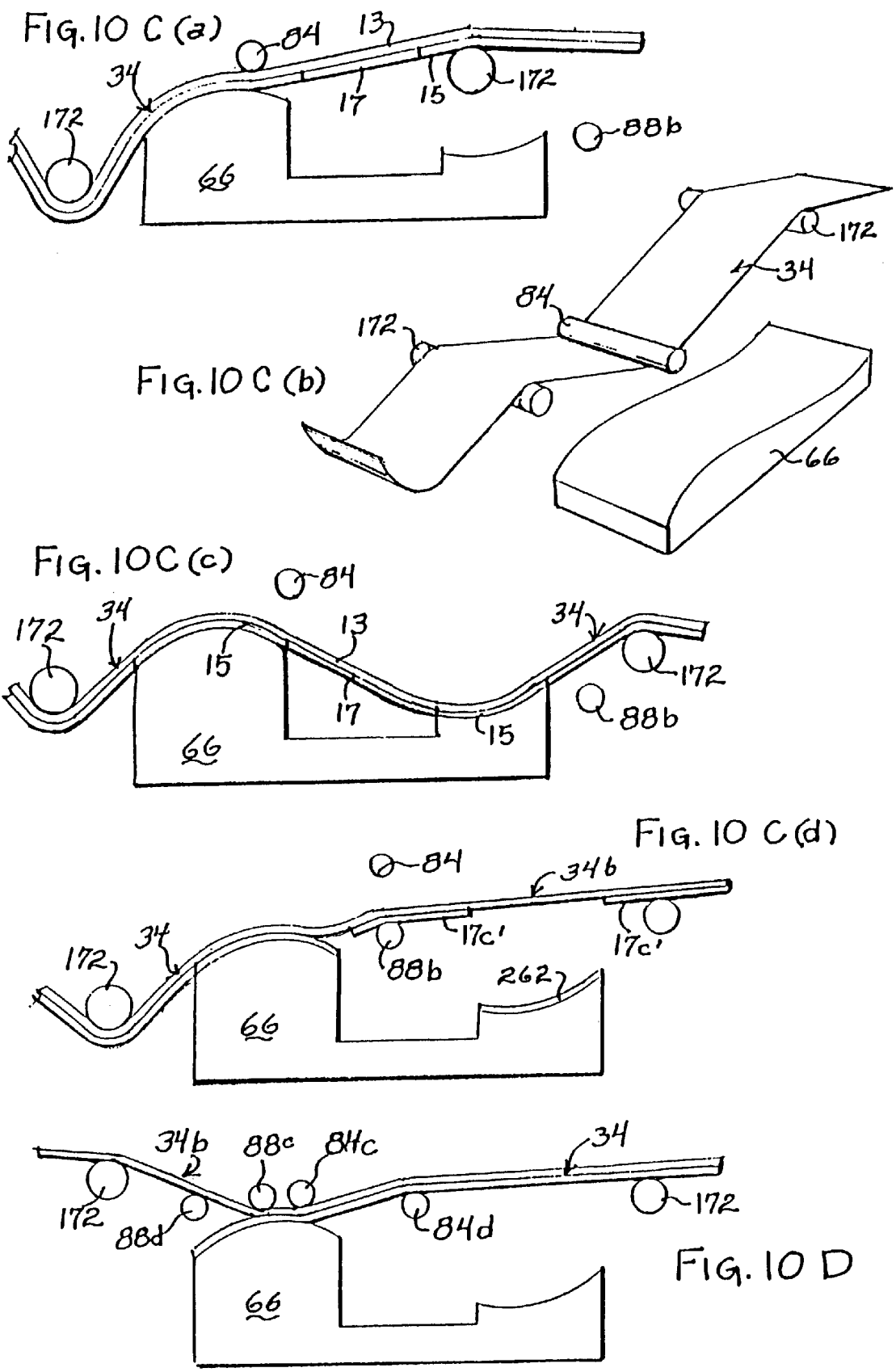

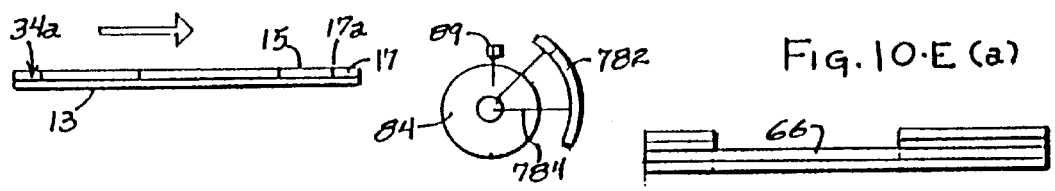
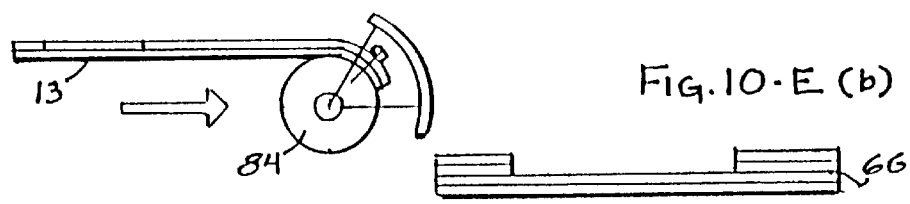
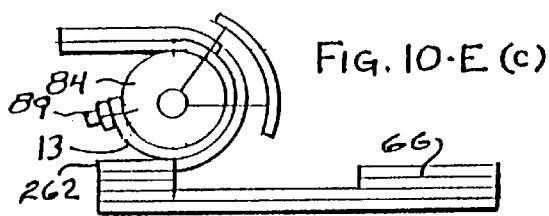
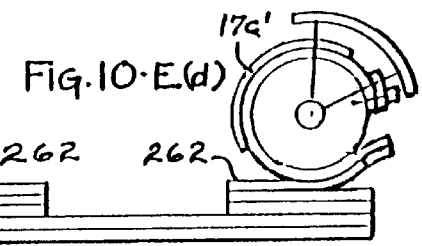
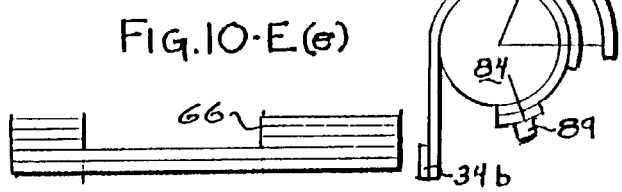
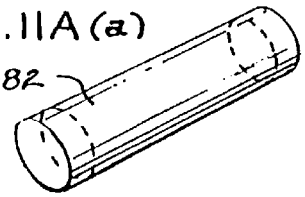
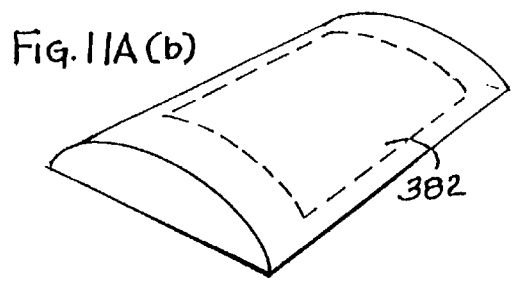
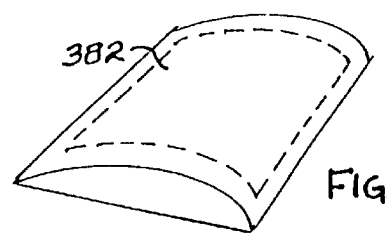
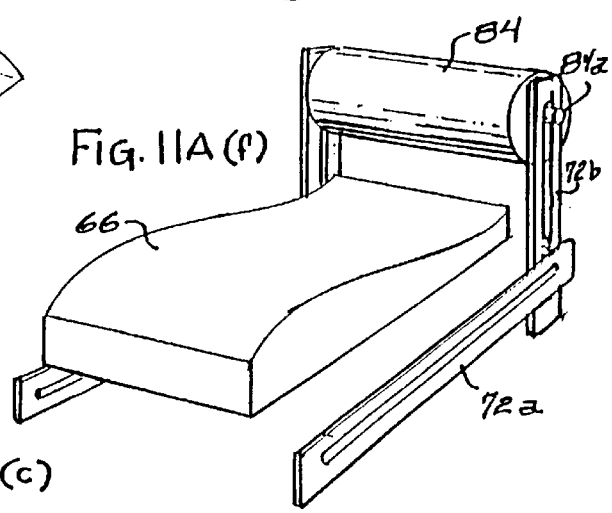

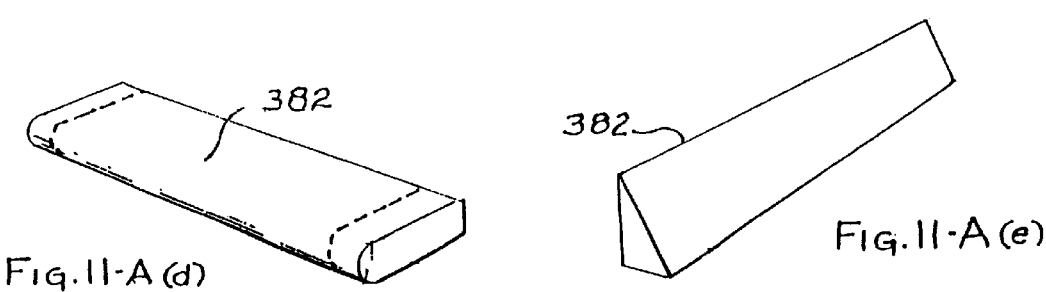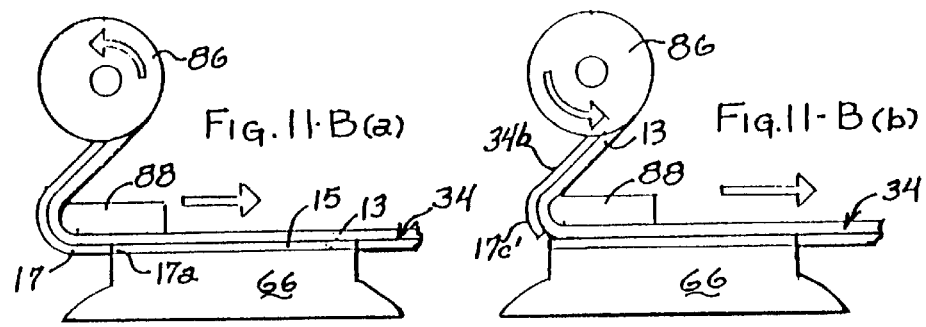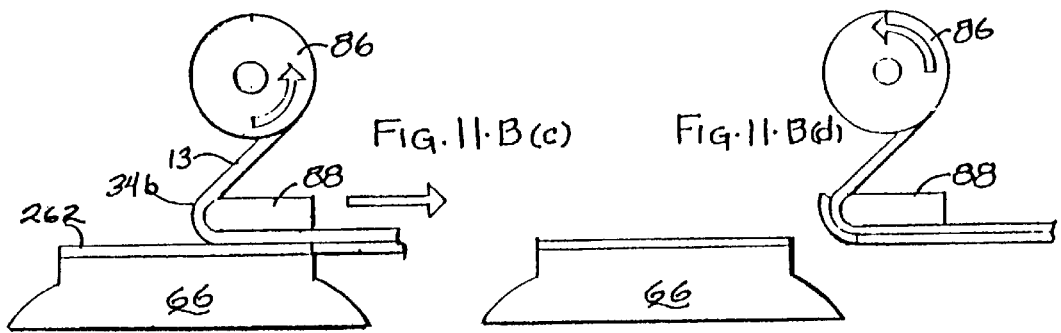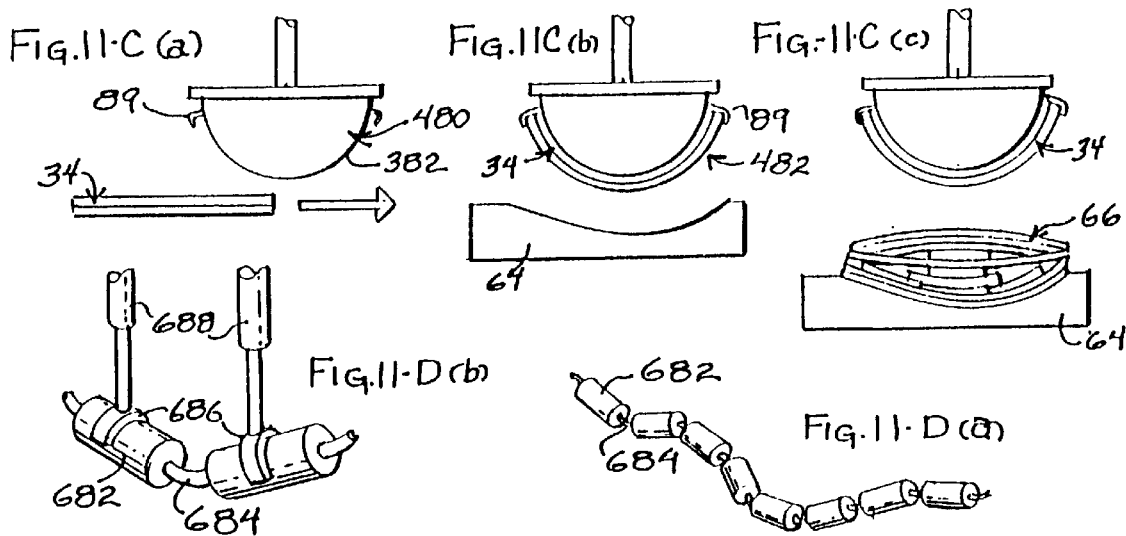

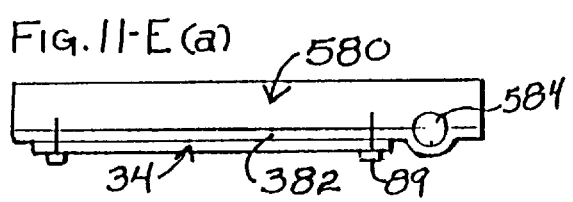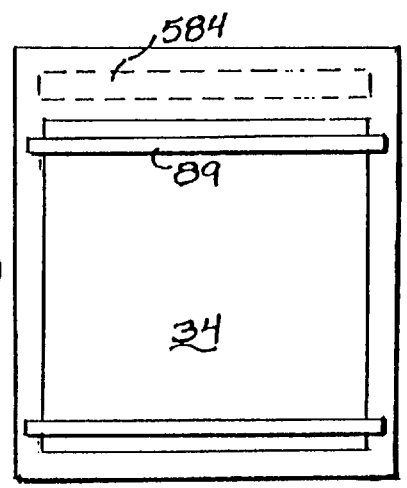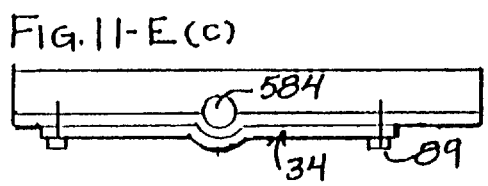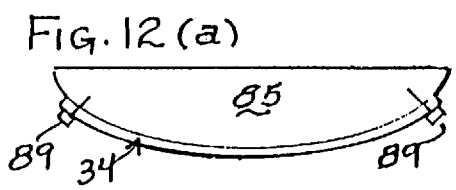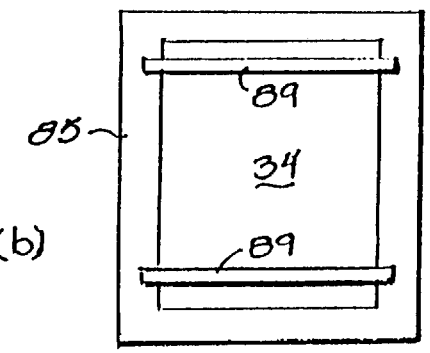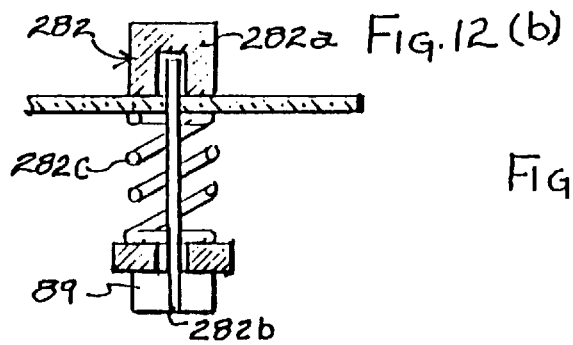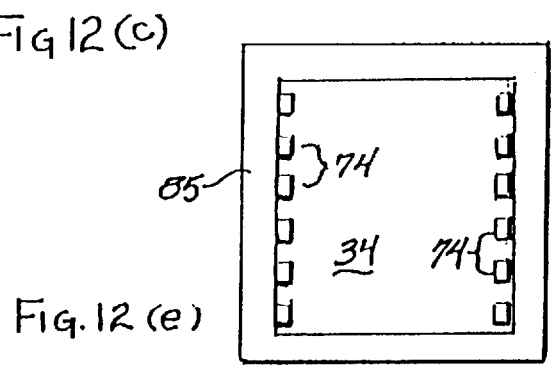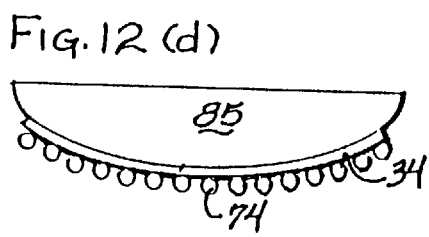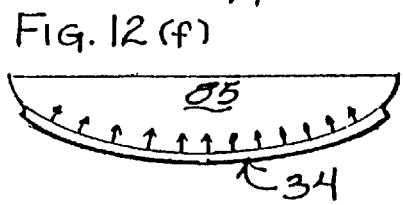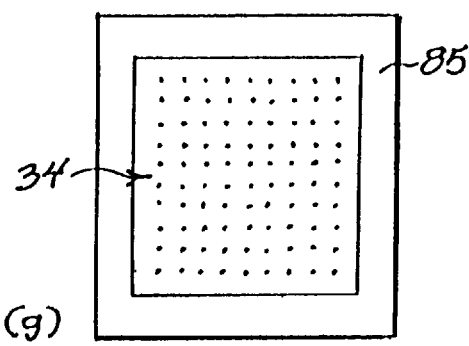

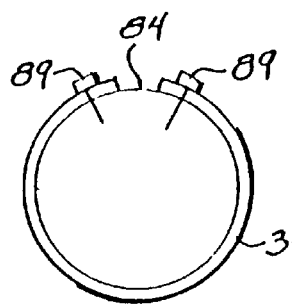
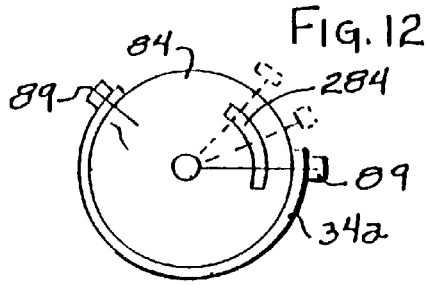
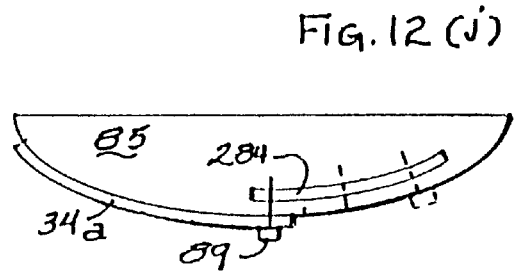
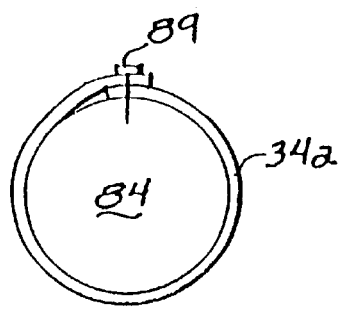
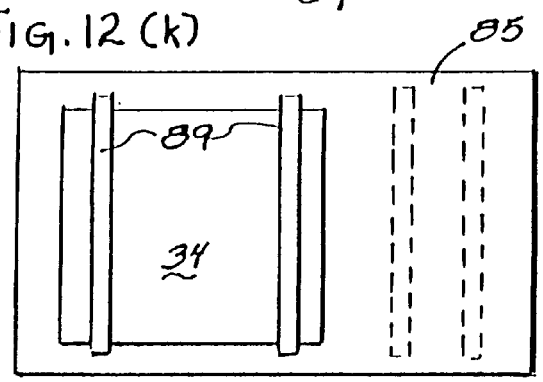
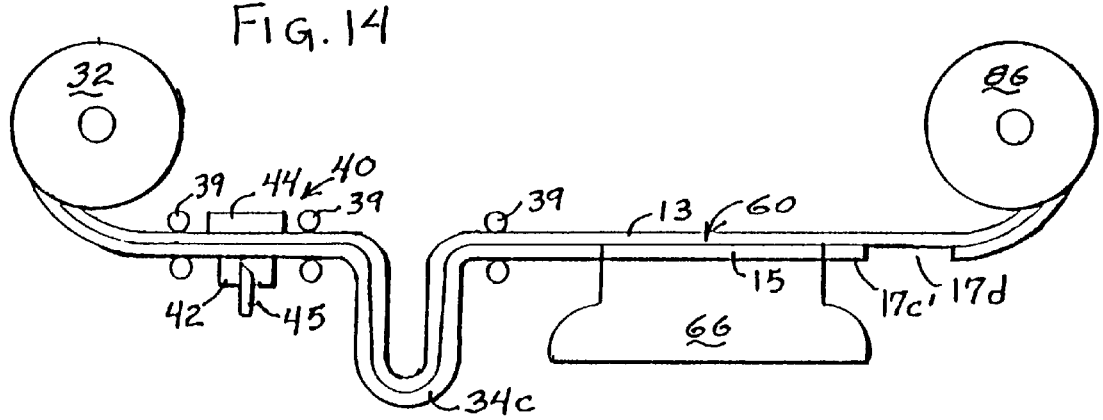

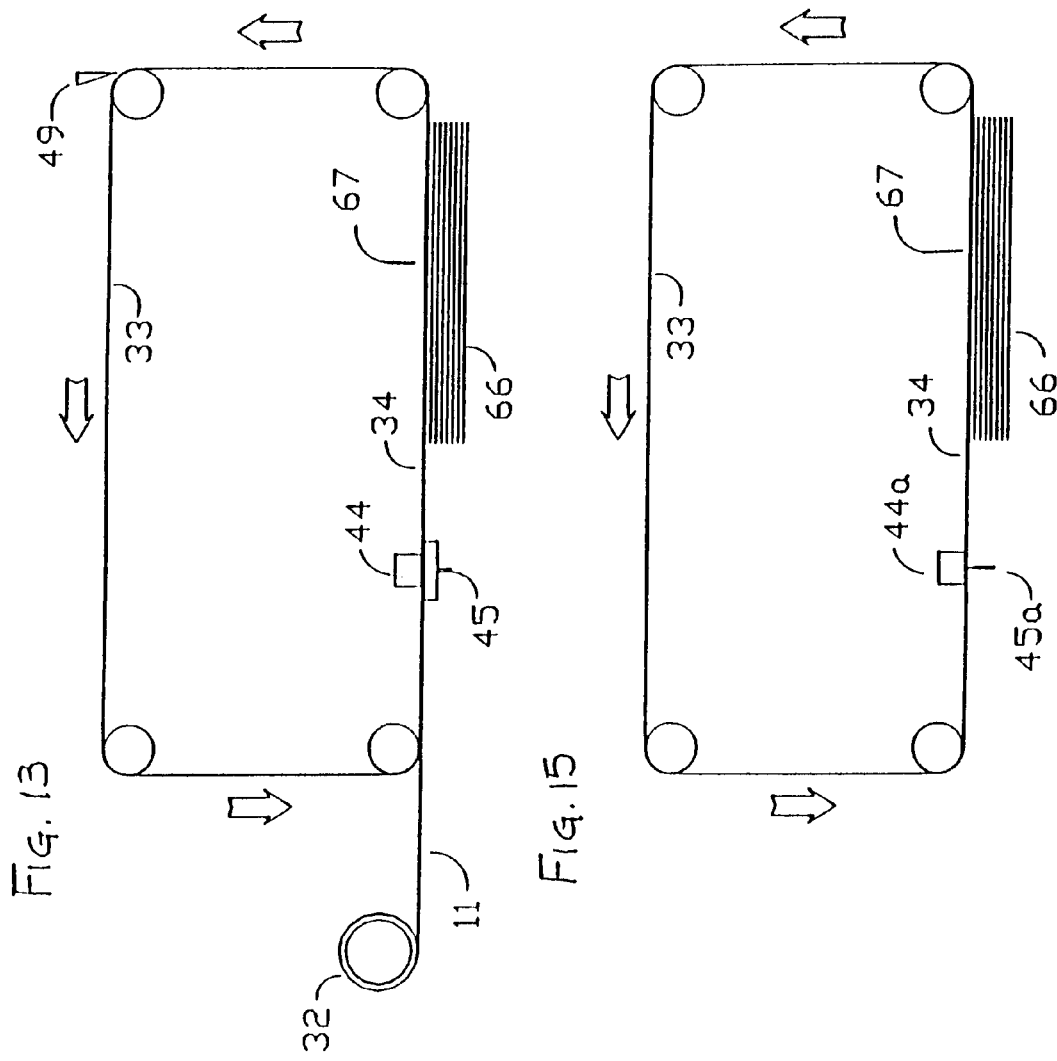

METHOD AND APPARATUS FOR AUTOMATIC FABRICATION OF THREE DIMENSIONAL OBJECT

RELATED APPLICATION

This application is a divisional application of U.S. patent application Ser. No. 08/640,549, entitled Method and Apparatus For Automatic Fabrication of Three-Dimensional Objects, filed May 2, 1996, now U.S. Pat. No. 5,879,489 which is a continuation-in-part of U.S. patent application Ser. No. 08/157,645, filed Nov. 24, 1993, and entitled Method and Apparatus For Automatic Fabrication of Three-Dimensional Objects, now U.S. Pat. No. 5,514,232. These related applications are incorporated herein by reference and made a part of this application.

TERMINOLOGY

Conveyed-Adherent: Referring to the method of automated fabrication described herein, in which successive patterns of fabrication material are formed on a substrate, and then the patterns of fabrication material are conveyed on the substrate into successive positions, and then the substrate is removed from the fabrication material. Conveyed-Adherent autofab may be implemented in either a fully additive or in a hybrid fashion. "Conveyed-Adherent" is a trademark of Ennex Fabrication Technologies of Los Angeles.

Carried-Sheet: Referring to a hybrid implementation of Conveyed-Adherent autofab in which the fabrication material is supplied in sheet form, and in which the patterns of fabrication material are determined by cutting the shapes of the patterns into successive pieces of the sheet material. "Carried-Sheet" is a trademark of Ennex Fabrication Technologies of Los Angeles.

Fabrication medium: Sheet material moving through a Conveyed-Adherent fabricator, consisting of adjacent substrate and fabrication material. The material moving through a fabricator may be sliced into individual segments of fabrication medium, or it may be a long, continuous fabrication medium containing the fabrication material for many successive layers.

Positive region: The region of space which is or will be occupied by a fabricated object or by material which will form part of a fabricated object.

Positive material: Fabrication material which does or will occupy a positive region and therefore does or will compose a fabricated object or part of a fabricated object.

Negative region: The region of space complimentary to a positive region.

Negative material: Fabrication material which does or will occupy a negative region and will therefore be removed.

Weeding: Separation of negative material from positive material in a single layer of fabrication material in a Carried-Sheet fabricator, so called because it is the removal of unwanted material.

Lay-down: Establishment of contact of fabrication material with stack.

Peel-off: Incremental removal (peeling) of substrate from fabrication material.

Consequent peel-off: Stacking in which lay-down is completed before peel-off begins.

Concurrent peel-off: Stacking in which peel-off is begun while lay-down is still in progress.

Simultaneous peel-off: Concurrent peel-off in which peel-off at each point is approximately simultaneous with lay-down at that point.

Delayed peel-off: Concurrent peel-off in which peel-off at each point takes point with some delay after lay-down at that point.

Platen: In a stacker, device that imparts forces on a fabrication medium to enact lay-down and/or peel-off.

Face of a platen: Portion of the surface of the platen which contacts a fabrication medium.

Shape of a platen: Shape of the platen's face.

Holding device or holding system: In a stacker, device or system which controls the motion and tension of the fabrication medium during lay-down and peel-off.

Holding platen: Combination of a platen to which the fabrication medium is rigidly held and the portion of the holding system which so holds the fabrication medium.

Flat: Description of a smooth surface at a point through which two different straight lines can be drawn in the surface.

Singly curved (having single curvature): Description of a smooth surface at a point through which only one straight line can be drawn in the surface.

Axis of curvature at a point of a singly curved surface: The one straight line which can be drawn in the surface through that point.

Doubly curved (having double curvature): Description of a smooth surface at a point through which no straight line can be drawn.

Radius of action: In a lay-down or peel-off action being performed by any kind of complicated platen system, the radius of a roller that would provide approximately the same configuration of forces as are actually being applied.

BACKGROUND OF THE INVENTION

1. Field of the Invention

This invention relates to a method and apparatus for automatic fabrication of three-dimensional objects from a plurality of individual layers of fabrication material stacked together in sequence to form the object. More particularly, the invention relates to the use of a substrate to convey each layer to a station where these layers are affixed to each other and then the substrate is removed.

2. Background Discussion

The idea of automated fabrication of three-dimensional solid objects dates back at least to the 18th century, when a pantograph-like device was used in France to copy medallions. James Watt later built several machines, based on the same principal, capable of carving full human busts. Over the past 45 years, machining, lathe-turning and grinding devices have been placed under computer control (called "CNC" for "computer-numerical control") to allow the generation of original shapes from designs entered into computers by engineers using computer-aided design (CAD) software. These processes are called "subtractive" fabrication, because they start with a solid block of material and generate the desired shape by removing material from the block.

Since the subtractive processes work by applying a cutting tool to a solid block, they have the common disadvantage of being limited in the shapes that they can generate. Intricate or nested structures are difficult or impossible to build by these methods. A more modern approach is "additive" fabrication in which a fluid or powdered material is solidified or congealed in successive small regions or layers to form the desired object. This idea goes back at least to the photo-relief process of Baese (U.S. Pat. No. 774,549), and has been substantially refined through dual-laser photopolymerization of Swainson (Danish Patent Application 3611), liquid droplet deposition of Masters (U.S. Pat. No. 4,665,492), single-laser photopolymerization of Andre (French Patent Application 84 11241) and Hull (U.S. Pat. No. 4,575,330), masked-lamp photopolymerization of Pomerantz (U.S. Pat. No. 4,961,154) and Fudim (U.S. Pat. No. 5,135,379), laser sintering of Feygin (U.S. Pat. No. 4,752,352) and Deckard (U.S. Pat. No. 4,863,538), and robotically guided extrusion of Crump (U.S. Pat. No. 5,121,329).

There are also several hybrid processes which combine additive and subtractive processes. Usually this involves cutting or etching the contours of individual layers of an object, and stacking and binding the contours. The earliest use of such a process is that of Morioka (U.S. Pat. No. 2,015,457), and more recent refinements have been made by DiMatteo (U.S. Pat. No. 3,932,923), Feygin (U.S. Pat. No. 4,752,352), Kinzie (U.S. Pat. No. 5,015,312), and Berman (U.S. Pat. No. 5,071,503).

Sparx AB of Sweden and Schroff Development Corporation of Mission, Kans., have manufactured manual systems which use a substrate to carry a sheet of fabrication material bonded to a substrate. Individual layers of material are formed by cutting through the material, removing negative material, and, prior to affixing successive layers, removing the substrate. These systems are similar to a Carried-Sheet fabricator, except that their operation is not fully automated and therefore cannot achieve the accuracy, speed, and ease of use of a Carried-Sheet fabricator.

All of the prior additive and hybrid processes suffer from several or all of the following drawbacks:

(1) Accuracy and resolution are limited to the domain of about 0.1 millimeters (0.004 inch). One reason is the difficulty of controlling the action of a laser beam (whether for irradiating, as in Hull or Deckard, or for cutting, as in Feygin), a particle jet (as in Masters), or an extrusion head (as in Crump), plus the difficulty of compensating for the width of the laser beam, jet stream or extrusion bead. Another reason is the minimum thickness of a single layer that can be formed from the raw material liquid or powder, or the minimum thickness of the extrusion bead that can be laid down.

(2) In the fully additive processes, large regions of solid material take a long time to fabricate, slowing down the process for building structures with such large solid regions.

(3) All of the processes are difficult and expensive to scale up for fabrication of large objects, because they involve complicated mechanisms of laser optics or robotics.

(4) All of the processes call for fabrication specifically in very thin layers, which limits the fabricator speed unnecessarily in cases where great resolution in the vertical direction is not necessary. In many instances, fabricator users would like to get a fast, low resolution, rendition of the desired object, but none of the prior art provides a way to achieve this.

(5) Only Kinzie and Crump provide a way to achieve a mixture of colors in the object generated. Kinzie requires a secondary printing process on special absorbent or translucent material to achieve this, and Crump requires the use of specially died materials.

(6) All of the processes always produce a solid object in a permanently fixed configuration, such that any fracturing or cross-sectioning of the object is tantamount to destroying it. No means has ever been provided for generating an object which can be temporarily taken apart into sections and easily reassembled with no loss of integrity.

(7) The raw materials for most of the processes are specialty chemicals which are expensive and, in some cases, are toxic or require special handling to prevent combustion.

(8) Many of the processes are limited to working with certain types of materials such as only photopolymers in the simple photocuring methods, or only thermally softenable materials in laser sintering.

(9) Most of the processes hide the object being built in an opaque solid or a murky liquid environment, depriving the fabricator user from the pleasure and benefit of watching the object take shape.

(10) All of the processes, except that of Sparx AB, use complicated and expensive mechanisms and/or electro-optical devices, making fabricators based on them large, heavy, expensive and difficult to maintain.

The ultimate commercial importance of automatic fabrication of three-dimensional objects is hampered by these disadvantages.

SUMMARY OF THE INVENTION

Advantages of the Invention

The method and apparatus of this invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENTS" one will understand how the features of this invention provide its advantages, which include:

(1) Accuracy and resolution can both be easily achieved in the domain of about 0.05 millimeters (0.002 inch). This can be further reduced to less than about 0.01 millimeters (0.0004 inch) with specially accurate cutting or positioning mechanisms and very thin materials.

(2) In several embodiments of this invention in which layers of the desired object are cut from sheet material, large regions of solid material are fabricated very quickly because they only require cutting around the periphery.

(3) In embodiments of this invention in which layers of the desired object are cut from sheet material, it is easy to scale up to build large objects. This is because the required mechanisms and components are quite simple and, in many cases, are already available for other purposes in large size formats.

(4) Thicker layers of materials are used when vertical resolution can be sacrificed for speed. This option is analogous to the "draft mode" available on dot matrix printers to achieve fast, low resolution, output. A means (angular cutting) is also provided for ameliorating this reduction of resolution.

(5) Colors can be easily incorporated and mixed in any desired degree of complexity in the fabricated object. For several embodiments, in which layers of the desired object are cut from sheet material, at least 60 colors are already available.

(6) In one variation of the method of this invention, fabricated objects are not permanently fixed, but can be easily separated at any one or more of many cross sections. The resulting sections can then be easily rejoined to form again the complete object. The object can be thus separated and rejoined at the same or different cross sections, repeatedly and without limitation.

(7) For several embodiments of this invention in which layers of the desired object are cut from sheet material, the raw materials are readily available and include inexpensive varieties. The materials are nontoxic and have no special handling or storage requirements.

(8) A wide variety of materials may be used in the process, including, metals, plastics, ceramics, and composites.

(9) The method of this invention can be practiced so as to leave the object being built visible during the fabrication process, providing the user with the pleasure and benefit of watching the object take shape.

(10) The method can be embodied using simple and inexpensive mechanisms, so that the fabricator equipment can be relatively small, light, inexpensive and easy to maintain.

Methods

The invention includes several methods for fabricating a three-dimensional object.

First Method

In the first method the fabrication material is formed into individual layers on a carrier substrate. Each layer has a predetermined configuration, and successive layers are stacked in a predetermined sequence and affixed together to form the object. The layers may vary in curvature, thickness, color, outline, and material composition from layer to layer or even within an individual layer.

In one embodiment, the method includes the steps of (a) providing a stacker, which is a station were the successive layers are stacked together, (b) forming on a carrier substrate a first layer of fabrication material, (c) conveying the first layer of fabrication material on said carrier substrate to said stacker and transferring to a base in said stacker, (d) separating the carrier substrate from the fabrication material, exposing a bonding surface on said first layer to which successive layers may be affixed, (e) forming on the carrier substrate a second layer of fabrication material and conveying the second layer of fabrication material on the carrier substrate to the stacker, (f) aligning the second layer in correct position with respect to said first layer and bringing the second layer into contact with the bonding surface on the first layer so that said layers become affixed together in the correct relative position and begin to form a stack, (g) separating by peeling said carrier substrate from the fabrication material after affixing the second layer to the first layer, exposing a bonding surface on the second layer to which other successive fabrication layers may be affixed, and (h) repeatedly forming and conveying successive fabrication layers on the carrier substrate in series to the stacker and aligning in correct position and then affixing the successive fabrication layers to the stack thus being formed and then separating the carrier substrate from each successive fabrication layer, until said object is formed as said stack.

This first method of this invention can be implemented either in an additive embodiment or in a hybrid embodiment where material is both added and subtracted. In the additive embodiment, the method calls for depositing on the carrier substrate successive layers of fabrication material having a configuration with predetermined boundaries where substantially no material is deposited outside the boundaries.

In the hybrid embodiment, the method calls for dividing the layers of fabrication material into a negative region of waste material and a positive region corresponding to the configuration of an individual fabrication layer, and then separating the negative material from the positive. The fabrication material may be in the form of a sheet of fabrication material supported by the carrier substrate, and the positive and negative regions may be formed by cutting through the material but not cutting through the substrate. The negative material may be left in place on the substrate when this layer is conveyed to the stacker, and removed along with the substrate when the substrate is separated from the positive material bonded to the stack. In either an additive or a hybrid embodiment, an adhesive may be used as a component of the fabrication material and/or of the substrate. Such adhesive component may participate in the bonding of layers to the stack, and/or it may hold the fabrication material to the substrate but allowing the substrate to be separated from the fabrication material when the positive material of the layer has become affixed to the stack.

Second Method

In the second method the fabrication material is formed into individual layers, where successive individual layers are stacked to form said object. This method includes (a) providing a station where the successive individual layers are formed into a stack, (b) placing on a carrier substrate a first layer of fabrication material corresponding to the configuration of one individual layer, (c) conveying the first layer of fabrication material on said carrier substrate to said station, (d) prior to separating the carrier substrate selectively inducing bonding of at least a portion of the fabrication material to the stack, and (d) separating said carrier substrate after bonding said one individual layer to said stack.

Third Method

The third method includes (a) providing a station where the successive individual layers are stacked together to form a stack, (b) placing on a carrier substrate a first layer of fabrication material and dividing said first layer of fabrication material into a negative region of waste material and a positive region corresponding to the configuration of one individual layer, (c) conveying the divided, first layer of fabrication material on said carrier substrate to said station, (d) prior to separating the carrier substrate, including the negative region of waste material, from the positive region, selectively inducing bonding of at least a portion of the positive region to the stack, and (d) separating said carrier substrate, including the negative region of waste material, from the positive region after bonding said positive region to said stack.

Fourth Method

The fourth method includes (a) providing a station where the successive individual layers are stacked together, (b) placing on a carrier substrate a first layer of fabrication material and dividing said first layer of fabrication material into a negative region of waste material and a positive region corresponding to the configuration of one individual layer, (c) conveying the divided, first layer of fabrication material on said carrier substrate to said station and transferring to said station, (d) separating the carrier substrate, including the negative region of waste material, from the positive region, exposing a bonding surface on said one individual layer to which a successive individual layer is affixed, said bonding surface including a first region which accepts a second layer of fabrication material and a second region that interferes with attaching said second layer of fabrication material to the bonding surface, (e) deactivating the second region of the bonding surface prior to affixing said second layer of fabrication material to the bonding surface, (f) placing on the carrier substrate a second layer of fabrication material and dividing said second layer of fabrication material into another negative region of waste material and another positive region corresponding to the configuration of a successive individual layer, and conveying the divided, second layer of fabrication material on the carrier substrate to said station, (g) aligning said individual layers and bringing said bonding surface on said one individual layer into contact with said successive individual layer so that said layers become affixed together, (h) separating said carrier substrate, including the negative region of waste material, from the positive region after affixing said one individual layer to said successive layer, exposing a bonding surface on said successive individual layer to which another successive fabrication layer is affixed, and (i) repeatedly aligning and then affixing successive fabrication layers together divided into positive and negative regions after conveying said successive fabrication layers on the carrier substrate in series to the station until said object is formed, first affixing individual successive fabrication layers together and then separating the carrier substrate, including the negative region of waste material, from each individual, successive fabrication layer.

Fifth Method

The fifth method calls for an improved way of fabricating a three-dimensional object from fabrication material formed into individual layers having a predetermined configuration, where successive individual layers are stacked in a predetermined sequence and affixed together to form said object. In this improved method a station is provided where the successive individual layers are stacked together, the successive layers being conveyed to the stacking station on a carrier substrate after dividing individual successive layers into a negative region of waste material and a positive region corresponding to the configuration of one individual layer, and separating the carrier substrate, along with the negative region of waste material, from the positive region, exposing a bonding surface on said one individual layer to which successive individual layers may be affixed. The improvement comprises selectively deactivating at least a portion of the bonding surface.

Sixth Method

A sixth method includes (a) providing a station where the successive individual layers are aligned and affixed together to form a stack having a bonding surface to which a successive individual layer is affixed, (b) placing one successive layer of fabrication material on a carrier substrate carried on a platen positioned next to said station, and (c) bringing said platen into engagement with the stack to affix the one successive layer to the bonding surface, and (d) separating said carrier substrate from the one successive layer when said one successive layer is affixed to the bonding surface by moving the platen to pull incrementally the carrier substrate from the stack.

In this sixth method substantially all of the fabrication material in each layer is affixed to the stack prior to removing the carrier substrate. A portion of the fabrication material in one layer is affixed to the stack, but before all the fabrication material in said one layer is affixed, a portion of the carrier substrate is removed. The fabrication material is affixed to the stack at the same time the carrier substrate is being removed. In this sixth method the platen has a face with (a) a constant single curvature, (b) a flexible curvature, or (c) a controlled curvature. The carrier substrate is releasably held to the platen, with the layer of fabrication material on the carrier substrate placed on the platen uniformly to avoid entrapment of air between the carrier substrate and the platen, so that the layer of fabrication material does not wrinkle or buckle.

Seventh Method

A seventh method for fabricating a three-dimensional object comprises automatically forming a stack of layers corresponding to the object by stacking said layers in a predetermined sequence. The individual layers each are first formed into a predetermined two-dimensional configuration as required to form the object, with at least some of the layers having a non-flat shape. Preferably, there is a base supporting the layers. This base has a curved surface, and at least one of the layers is placed on the curved surface of the base, so that the one layer has a non-flat shape conforming to the curved surface of the base. The base element may be placed at the bottom of the stack or between layers. In this seventh method, from layer to layer the size of the layers are different to create a curvature as subsequent layers are overlaid.

Eighth Method

An eighth method comprises stacking a plurality of layers together in a predetermined sequence and affixing them together to form the object, at least some of the layers being formed from a pliable material having thicknesses which vary as mathematical functions of the surface extent of the layers, where said mathematical functions are calculated to accommodate the curvature said individual layers will assume in the stack, such curvature causing the thickness of the layer to change when stacked. The layers are conveyed to a stacking station on a carrier substrate, each layer preferably having the ability to adhere to a stack of previous layers. There may be an interstitial base element placed between layers of material or from layer to layer the size of the layers are different to create a curvature as subsequent layers are overlaid.

Ninth Method

A ninth method includes
- (a) providing a station were the successive individual layers are stacked together,
- (b) forming on a surface of one or more carrier substrates a series of layers of fabrication material corresponding to the configuration of individual layers by extruding the fabrication material through a nozzle guided over said surface of a carrier substrate,
- (c) conveying said layers of fabrication material on a carrier substrate to said station,
- (d) aligning layers and bringing each of said individual layers into contact with a successive individual layer so that said layers become affixed, and
- (e) separating the carrier substrate from the individual layers of fabrication material, exposing a bonding surface to which a successive individual layer is affixed.

Tenth Method

A tenth method calls for individual layers to be stacked in a predetermined sequence and affixed together to form the object with minimal layer-to-layer graininess. This method includes
- (a) forming said individual layers with edges that slope in a manner that minimizes layer-to-layer graininess upon stacking the successive layers on top of each other, said edges forming corners with the surfaces of the layers, and
- (d) stacking said individual layers together in a predetermined manner with the corners of one edge meeting the corners of the edges of both the previous layer and the next following layer, whereby layer-to-layer graininess is minimized.

Eleventh Method

An eleventh method calls for at least two of layers being bonded by a process which is capable of being released and reactivated, so that the object may be separated into sections along an interface between said two layers and easily reassembled.

Twelfth Method

A twelfth method is draft mode. In this method, each of the layers has a predetermined thickness which is several times thicker than the thickness of the layers needed to attain normally acceptable resolution. These thicker layers reduce the layer-to-layer resolution of the object but enable the object to be fabricated at a substantially higher speed than that attainable at normally acceptable resolution. The thickness of the layers to attain normally acceptable resolution is from 0.01 to 25 millimeters, and each of the layers has a predetermined thickness at least 3 times the thickness to attain normally acceptable resolution.

Apparatus

In general, the apparatus includes a formation station where successive layers of fabrication material are formed on a carrier substrate and then conveyed to a stacker where they are separated from the substrate and bonded together to form the desired three-dimensional object. The following are some of its major features. Other features are discussed in the section "Detailed Description Of The Preferred Embodiments."

The first feature of the apparatus of this invention is the formation station where the successive, individual fabrication layers are formed on successive carrier substrates. The layers of fabrication material each have a predetermined configuration, and successive layers are stacked in a predetermined sequence and affixed together to form the object at a stacker. The substrate and fabrication material may be in the form of a sheet and there may be an adhesive component of the fabrication material and/or of the substrate which participates in the bonding of the layers to the stack and/or holds the fabrication material to the substrate but allows the substrate to be separated from the fabrication material when the positive material of the layer has become affixed to the stack.

The second feature is that a deposition mechanism may be used to deposit on a carrier substrate a fabrication material to form successive layers, each successive layer having a configuration with predetermined boundaries, with substantially no material deposited outside said predetermined boundaries.

In an alternate embodiment, a fabrication material may be supplied in the form of a sheet on a substrate, and a cutter may be used to cut through the fabrication material, but not though the substrate, to divide the fabrication material into a negative region of waste material and a positive region corresponding to the configuration of an individual layer. In one embodiment, a waste material removing mechanism ("weeder") removes the negative material from a layer prior to conveying the layer to the stack. The negative material may alternatively remain on the substrate until after the layer is adhered to the stack, and when the substrate is separated the negative material adheres thereto and is thereby removed.

The third feature is a conveyor for conveying in the predetermined sequence the successive fabrication layers on the successive carrier substrates from the formation station to the stacker. An alignment mechanism aligns the successive fabrication layers so that each successive fabrication layer is in the correct position with respect to the stack.

The fourth feature is that successive carrier substrates may be sections of a continuous belt which travels along a predetermined path past the formation station and stacker. There are means for placing onto the belt in advance of the stacker fabrication material corresponding to the physical dimensions of an individual layer. If the fabrication material is cut into positive and negative regions, there are means for transferring the positive material to the stacker and for removing the negative material prior to placing onto the belt a successive layer of fabrication material. Instead of a continuous belt, the substrate may be a series of individual sheets, sections of a roll of material, or a single plate used repeatedly, or a revolving set of such plates.

The fifth feature is a separator which separates each successive carrier substrate from the fabrication layer thereon to expose a bonding surface on each fabrication layer. An affixing mechanism brings each successive fabrication layer conveyed to the stacker into contact with the stack, allowing or inducing the new layer and the stack to bond to each other.

The sixth feature is that the separator separates each successive carrier substrate from the fabrication layer thereon after affixation of this layer to the stack.

The seventh feature is a weeder mechanism which selectively removes the negative region of waste material from the carrier substrate. The weeder mechanism, which is in advance of the stacking station, may include a pick-up film which selectively contacts the negative region of waste material. The weeder mechanism may also include a device which selectively treats at least a portion of the negative region of waste material to render the selected portion susceptible to adhesion to the pick-up film which subsequently contacts the negative region of waste material. The weeder mechanism may include a barb element that selectively engages and retains a negative region of waste material until the retained negative region of waste material is removed from the barb element.

An eight feature is the use of a continuous roll of carrier substrate having thereon a continuous layer of fabrication material, and a formation station where successive, individual fabrication layers are formed on the carrier substrate by dividing successive segments of the continuous layer of fabrication material into a negative region of waste material and a positive region corresponding to the configuration of one individual layer. There is a stacking station where the positive regions of the successive segments of the continuous fabrication layer are sequentially stacked to form the object, and a conveyor conveys the successive segments formed at the formation station to said stacking station on the continuous carrier substrate. An affixing and separating mechanism affixes said positive region to a stack of layers at the stacking station and separates the positive region of each successive segment from the carrier substrate. A portion of the continuous carrier substrate between the formation station and said stacking station is maintained by said conveyor in a slack state.

A ninth feature is that the affixing and separating mechanism includes a platen device about which the sheet material is wrapped. The platen device is moved along a path adjacent the stack, bearing against the stack to deposit the fabrication material onto the stack. The platen device as it moves along the path retains on the platen device the substrate.

The tenth feature is employing a flexible sheet member comprising a substrate and a fabrication material having an exterior surface and an internal surface carrying an adhesive which bonds the fabrication material to the substrate but allows the substrate to be removed to expose the adhesive upon separation of the substrate from the fabrication material. A cutter in advance of the stacking station partially severs the sheet member, cutting through the fabrication material but not the substrate to form on the substrate a positive region corresponding to a predetermined configuration for an individual layer of fabrication material and a negative region of waste material. An affixing and separating mechanism at said stacking station receives the sheet material from the cutter and separates each successive carrier substrate from the individual fabrication layer thereon to expose the adhesive on said internal surface of the individual fabrication layer. This affixing and separating mechanism includes a roller device about which the sheet material is wrapped. The roller device is moved along a path adjacent a previously stacked fabrication layer which has its adhesive bearing, internal surface exposed, bearing against the previously stacked fabrication layer to deposit the fabrication material carried by the roller device on said exposed, adhesive bearing, internal surface of said previously stacked fabrication layer, with the adhesive on said internal surface of said previously stacked fabrication layer bonding to said exterior surface of the individual fabrication material. The roller device as it moves along the path retains on the roller device the substrate, and any negative region adhering thereto, to expose the internal surface of the individual fabrication material being deposited so that a successive fabrication layer may be bonded thereto. The roller device is first moved in one direction to deposit the sheet material, including both the substrate and the individual fabrication layer thereon, on the previously stacked fabrication layer, and then moves in an opposite direction to separate the substrate and any negative region of waste material thereon from the deposited fabrication layer.

The eleventh feature is that the affixing and separating mechanism includes a roller device which is moved along a path adjacent the stack. The roller device bears against the sheet member so that the exterior surface of the fabrication material contacts the exposed adhesive, bonding to the stack. The roller device as it moves along said path pulls the substrate, and any negative region adhering thereto, from the individual layer to expose its internal surface so that successive fabrication layers may be bonded thereto. The roller device is moved in a sequence so that the exterior surface of the individual fabrication layer is bonded to the stack prior to separation of the substrate from said individual fabrication layer. The roller device moves first to bond selectively the individual fabrication material to the stack and moves again to pull the substrate, and any negative region adhering thereto, from said individual fabrication layer bonded to the stack. The roller device may include a set of spaced apart parallel rollers. The rollers includes a gripper mechanism which grips an edge of the sheet member and pulls the substrate, and any negative region adhering thereto, from the stack. Preferably, a waste material removing mechanism removes, at least partially, the negative region of fabrication material from the substrate prior to the affixation of the layers.

The twelfth feature is a fabrication material removal mechanism in advance of the stacking station which selectively removes substantially all of interfering negative region from the substrate prior to stacking of the individual fabrication layers. A separator separates from the fabrication layers each successive, individual carrier substrate with any remaining non-interfering negative region remaining thereon after affixation of the previous individual fabrication layer to the next successive fabrication layer. A gripper mechanism grips an edge of a substrate and pulls the substrate, and any negative region adhering thereto, from stacked layers affixed together.

BRIEF DESCRIPTION OF THE DRAWING

The preferred embodiments of this invention, illustrating all its features, will now be discussed in detail. These embodiments depict the novel and non-obvious methods and apparatus of this invention shown in the accompanying drawing, which is for illustrative purposes only. This drawing includes the following figures (Figs.), with like numerals indicating like parts:

FIG. 1 is a flow chart illustrating the Conveyed-Adherent process of automated fabrication, the fabrication method of this invention.

FIG. 2(a) is a perspective view of an example fabricated object, a coffee cup, made according to the method of this invention using the apparatus depicted in FIG. 6A.

FIG. 2(b) is a cross-sectional view taken along line 2B—2B of FIG. 2(a).

FIG. 2(c) is a side view of the cup shown in FIG. 2(a) using portions of negative material as a support for the handle of the cup.

FIG. 6A(b) is a side view of the fabricator shown in FIG. 6A(a).

FIGS. 7A, sub parts (a) through (c), schematically illustrate one embodiment of a weeder.

FIGS. 7B, sub parts (a) through (f), schematically illustrate another embodiment of a weeder for small regions.

FIG. 8 schematically illustrates selective adhesion activation.

FIG. 9(a) and FIG. 9(b) are perspective views of the cup shown in FIG. 2(a) schematically illustrating selective adhesion neutralization on exposed surfaces.

FIGS. 11A, sub parts (a) through (f), depict variations on platen design having a constant single curvature, where FIG. 11A(a) is a perspective view of a roller (cylindrical platen); FIG. 11A(b) is a perspective view of an arc platen; FIG. 11A(c) is a perspective view of a wing platen; FIG. 11A(d) is a perspective view of a bar platen, FIG. 11A(e) is a perspective view of a blade platen; and FIG. 11A(f) is a perspective view of a a roller platen mounted for vertical and horizontal movement.

FIG. 11B, sub parts (a) through (d), are cross-sectional views of the action sequence of the operation of a peel-off bar.

FIG. 11C, sub parts (a) through (c), are side views of the action sequence of the operation of a pillow platen.

FIG. 11D, sub parts (a) and (b), are perspective views of a sausage platen.

FIG. 11E, sub parts (a) and (c), are side views of the action sequence of the operation of a flat platen with controlled curvature, and sub part (b) is a plan view of the platen shown in sub parts (a) and (c).

FIG. 12, sub parts (a) through (l), illustrate various devices for holding a fabrication medium to a platen.

FIG. 13 is a schematic view illustrating an alternate type of Carried-Sheet fabricator using an endless belt substrate to convey the fabrication material to the stacker.

FIG. 14 is a schematic view of an example of a Carried-Sheet fabricator using continuous take-up of scrap.

FIG. 15 is a schematic view illustrating an example of an additive Conveyed-Adherent fabricator using a deposition device to deposit fabrication material on an endless belt substrate.

DESCRIPTION OF THE PREFERRED EMBODIMENTS

Method

Figure 3A:
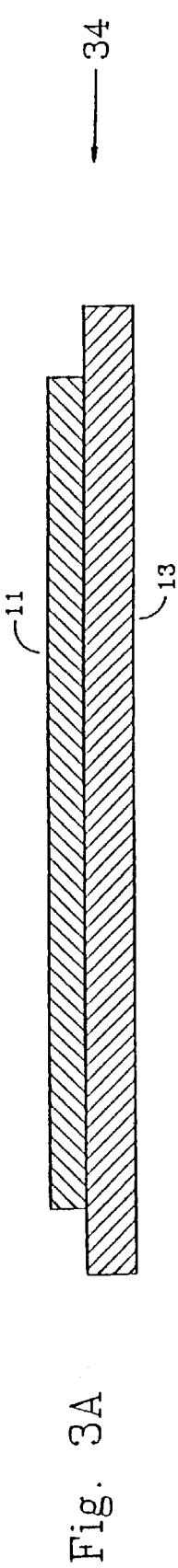
FIG. 3(a) is an enlarged, cross-sectional view of a fabrication medium, showing fabrication material being supported by a substrate that carries the material to a stacker.
Figure 3B:
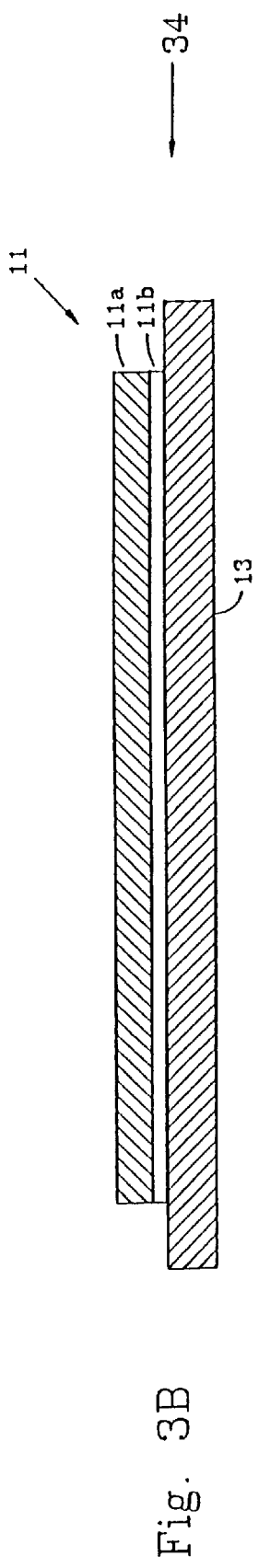
FIG. 3(b) is a cross-sectional view similar to that shown in FIG. 3(a), where the fabrication material comprises sublayers, where one sublayer may be a primary fabrication material and another sublayer may be an adhesive material.

The flow chart of FIG. 1 depicts the method of this invention, which includes the three primary operations of mathematical modeling, formation of layers, and affixing of the layers. As depicted in FIG. 2, a three-dimensional object such as a cup 10 may be fabricated from successive stacked and bonded layers of fabrication material 11 (FIG. 3(c)). Individual layers are formed from the fabrication material 11, each layer having the required dimensions and contour so that when stacked together in sequence they form the cup 10. These layers are aligned in correct relative position and affixed together in sequence to form the base 10d, walls 10a, and handle 10b of the cup 10 shown in FIG. 2(a). FIG. 2(c) shows some support structures 10c used to support the handle 10b of the cup 10. After fabrication, these support structures 10c are removed.

I Mathematical Modeling

A mathematical model of the object is made, where a data representation of the desired three-dimensional object is ordered in a set of numerical representations of layers which, together, represent the whole object. In other words, a series of data packages, each data package corresponding to the physical dimensions of an individual layer of fabrication material, is stored in the memory of a computer in logical sequence so that the data packages correspond to individual layers of fabrication material stacked together to form the object.

Creation of data packages. Prior to formation of the layers from the fabrication material, the geometry of the desired three-dimensional object is logically divided into a sequence of mutually adjacent theoretical layers, with each theoretical layer defined by a thickness and a set of closed, non-intersecting curves lying in a smooth two-dimensional surface. These theoretical layers, which exist only as data packages in the memory of the computer, are referred to as "logical layers." In the simplest circumstance, each two-dimensional logical layer will be a plane so that each layer will be flat, and the thickness will be the same throughout any particular layer. However, this is not necessarily so in every case, as a layer may have any desired curvature and the thickness of a layer may be a function of position within its two-dimensional surface. The only constraint on the curvature and thickness function of the logical layers is that the sequence of layers must be logically adjacent. This means that, in considering two layers that come one after the other in the sequence, the mutually abutting surfaces of the two layers must contact each other at every point, except at such points of one layer where the corresponding point of the other layer is void of material.

The data packages for the logical layers may be created by any of several methods:

(1) For a three-dimensional computer-aided design (CAD) model, by logically "slicing" the data representing the model, (2) For topographic data, by directly representing the contours of the terrain, (3) For a geometrical model, by representing successive curves which solve z= constant for the desired geometry, and (4) Other methods appropriate to data obtained by computer tomography, satellite reconnaissance, laser digitizing, line ranging, or other methods of obtaining a computerized representation of a three-dimensional object.

Various techniques for carrying out the mathematical modeling are discussed in depth in Chapter 5 of Computer-Aided Design and Manufacturing by Farid M. L. Amirouche, Prentice Hall, 1993, and CAD Modeling and Alternate Methods of Information Transfer for Rapid Prototyping by Richard J. Donahue and Robert S. Turner in proceedings of the Second International Conference on Rapid Prototyping, University of Dayton, 1991.

Interactive processing of logical layers. An alternative to calculating all of the logical layers in advance is to perform measurements of the dimensions of the growing object as each new layer is bonded, and to use this information to help in the determination of where each new logical layer of the object should be, and possibly what the curvature and thickness of each new layer should be. This will often result in more accurate final dimensions of the fabricated object because the actual thickness of a sequence of bonded layers may be different than the simple sum of the intended thicknesses of the individual layers.

Positive and negative regions. A set of closed, non-intersecting curves that are part of the definition of each layer unambiguously divide a smooth two-dimensional surface into two distinct regions. ("Region" does not mean a single, connected area. Each region may consist of several island-like subregions that do not touch each other.) One of these regions is the intersection of the surface with the desired three-dimensional object, and is called the "positive region" of the layer. The other region is the portion of the surface that does not intersect the desired object, and is called the "negative region." These curves are the boundary between the positive and negative regions, and are called the "outline" of the layer. Fabrication material which lies in a positive region is "positive material," while fabrication material lying in a negative region is "negative material." The definition of a layer may also include other curves, such as curves which form the boundary between different materials or curves which indicate where non-boundary cuts or other operations are to be performed on fabrication material.

II Formation of Layers

The data packages are stored in the memory of the computer, which controls the operation of the fabrication equipment. Using these data packages, the computer controls automated formation equipment to manipulate the fabrication material to form on the surface of a substrate a layer of material in accordance with the specifications of a data package. The fabrication material used to form the layers has the property that layers brought into contact bond to each other. Possibly, the material may require ancillary treatment to have the desired bonding characteristic.

Properties of the fabrication material. It is not necessary that the deposited material have structural integrity upon being deposited. It should be capable of forming a layer which maintains the desired pattern and thickness on the substrate during conveyance, and is capable of assuming a state of structural integrity when bonded to the stack. For example, the deposited material may be a powder or a gel which, if shaken vigorously, might fall off the substrate or become smeared, but which, protected from shaking, remains in place on the substrate. Furthermore, the fabrication material may or may not be homogeneous. It may, for example, exhibit variations in composition based upon the structural requirements of the desired object being built. These variations may serve to accomplish internal variations of the physical properties of the object, such as hardness, mass density, coefficient of thermal expansion, color, etc. Another case in which the fabrication material may be inhomogeneous would be one in which the fabrication material consists of a stratum of a primary material and a stratum of adhesive material. In this example, the primary material would provide the gross physical characteristics of the object, while the adhesive would generally provide bonding between the layers, although the adhesive can also contribute to the overall characteristics.

Fabrication raw materials. The raw materials that can be used to form the layers include various types and combinations of metals, plastics, ceramics, and composites, such as:

(a) Hardenable pastes and gels, including (i) common adhesives, such as Elmers® glue from Borden Inc. of Columbus, Ohio, (ii) metal or ceramic powders or whiskers suspended in a polymer matrix, such as Fodel® and Formon® thick film compositions from DuPont of Wilmington, Del., (iii) sol-gel derivatives, such as ormosils (organically modified silicates), and ceramers, and (iv) other formulations of pastes and gels.

(b) Molten metals, thermoplastics, and ceramics, which harden by freezing.

(c) Plastic resins that harden by various means, such as photonic, thermal, electrostatic, and other means.

(d) Other soft or fluid materials which are hardenable or fusible by various means, (e) Sheets of plastic, wax (including investment casting wax), foam, linoleum, fabric (including open-weave fabric), paper (including cardboard and corrugated cardboard), cork, metal (including metal foil and tape-cast metal), ceramic (including tape-cast ceramic), or composite prepreg.

(f) Plastic, foam, metal, paper, ceramic, or other sheets with adhesive coating, such as Calon® II cast vinyl film from Arlon of Santa Ana, Calif., ScotchCal™ films from 3M Company of St. Paul, Minn., sandblast stencil material from Anchor Continental, Inc. of Columbia, S.C., ISODAM® elastomeric sheets from E-A-R Specialty Composites of Indianapolis, Ind., Spar-Cal™ Metal Mend aluminum foil or Spar-Cal™ Chrome Brite aluminum foil from Spartan International, Inc. of Holt, Mich., and Fasson™ label paper from Avery Dennison Corporation of Pasadena, Calif.

(g) Sheet materials that engage in bonding without the use of an adhesive, such as the cohesive vinyl used in the manufacture of Stik-ees® glueless plastic decals by Stik-ees® of Vista, Calif., or Koroseal® flexible magnetic sheeting from RJF International Corporation of Cincinnati, Ohio.

(h) Various combinations of plastic, metal, or ceramic sheets, strips, and/or filaments with molten, thermosetting, or other type of binder or matrix material.

(i) Other appropriate combinations of materials.

Methods of varying material composition. If variation of the composition of the fabrication material is desired within any particular layer, and if the mechanism for depositing the fabrication material has the capability of depositing the required various compositions automatically, then the variation in composition may be represented mathematically within the data package for each layer, and the mathematical representation used to control the composition of material deposited. However, if the mechanism for depositing the fabrication material is limited to providing layers of any one specific composition at a time, then variations in composition may be accomplished by logically separating a particular layer into sublayers, where each sublayer is composed of a different material, and the union of the sublayers is equal to the particular layer. Each sublayer is then treated as a distinct layer in the fabrication process, and the complete layer is formed by the formation and bonding of a succession of its constituent sublayers. If the interface between sublayers is along surfaces perpendicular to the layers, and not along surfaces parallel to the layers, then the bonding of each sublayer is not to the previous sublayer, but to the previous complete layer.

Figure 4A:
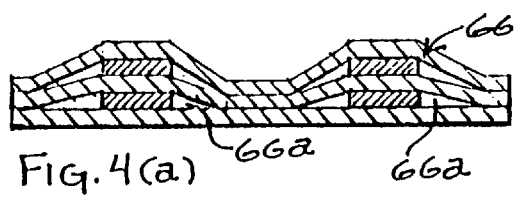
FIG. 4(a) is a cross section of a stack showing one way of varying curvature of layers.
Figure 4B:
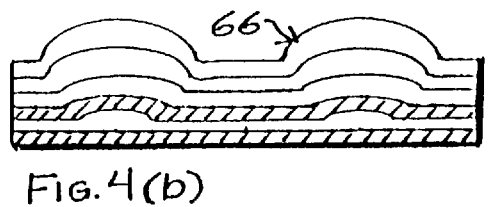
FIG. 4(b) is a cross section of a stack showing a second way of varying curvature of layers.
Figure 4C:
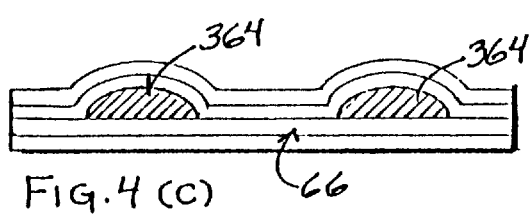
FIG. 4(c) is a cross section of a stack showing a third way of varying curvature of layers.

Methods of Varying Curvature of Layers. In an object made of curved layers, one often wants the curvature to vary from layer to layer. FIGS. 4(a), (b) and (c) illustrates three ways to accomplish this. FIG. 4(a) shows a stack 66 consisting of five layers in which the second and fourth layers (counting from the bottom) consist of shorter segments separated by gaps 66a. When the material of the third and fifth layers is laid down, it curves around these segments and falls into the gaps. In this way the third and fifth layers become curved. FIG. 4(b) shows a stack 66 consisting of six layers in which the first and third layers have uniform thickness, while the other layers have variations in their thicknesses. When a layer has nonuniform thickness, the curvature of its top surface is different than the curvature of its bottom surface. The differences in curvature build up from layer to layer, inducing curvature in all higher layers in the stack, as seen in this figure. FIG. 4(c) shows a stack 66 in which all layers are continuous (no gaps) and all layers are of uniform thickness, but an interstitial base 364 has been inserted on top of the second layer before laying down the third layer. Interstitial base 364 induces curvature in the third layer and thereby in all subsequent layers. Interstitial base 364 may be inserted on stack 66 (after lay-down of the second layer) either automatically according to preprogrammed computer instructions, or manually upon pausing of the fabricator to wait for this manual insertion to be performed.

"Draft Mode" fabrication. Depending on the method of depositing the fabrication material, the fabrication process will often go faster if the layers are thicker. However, thicker layers reduce the layer-to-layer resolution of the fabricated object. Thus, there is a trade-off between speed and layer-to-layer resolution. This trade-off can be used to advantage by building initial rough models of the desired three-dimensional object quickly, and then reducing the layer thickness as the design becomes more certain and a more careful representation is desired. This is similar to the option provided in dot matrix printers between "draft mode" and "correspondence mode" printing.

Description of the substrate. If the layers are flat or singly curved, then the substrate may be a simple sheet material, such as paper, plastic or metal. In this case, the substrate may be, for example, a separate segment for each layer, or it may be a long roll on which fabrication material has been deposited in advance, or it may be a continuous roll that is cycled through the fabrication equipment to serve over and over again for new layers. If, however, the layers have more complicated curvature, then the substrate must be a flexible material, capable of assuming the correct curvature and imposing that curvature on the fabrication material. For example, the substrate may have a structure resembling that of crepe paper, and be attached to a system of robotically controlled fingers capable of manipulating its shape. In another example, the substrate may be a sheet of plastic with a great tolerance for stretching, and be attached to a system of electromagnetically controlled rods that push and pull on it to create the desired shape. The curvature of the substrate may be set prior to the deposition of the fabrication material on it, or the fabrication material may be deposited first and the substrate later contorted into the desired curvature. The curvature of the stack may be used, when the new layer is brought into contact with it, to establish the curvature of the new layer, but the substrate must be capable of yielding to and assuming this curvature in order to maintain the relative position of the parts of the new layer as it is being brought into contact with the stack.

Accommodating thickness of layers to changes in curvature. If the substrate assumes the correct curvature of the new layer prior to the deposition on it of the fabrication material, then the fabrication material may be deposited in the correct final thickness of the layer. If, however, the curvature of the substrate is to change after deposition on it of the fabrication material, then the thickness with which the fabrication material is deposited must be calculated such that the layer will assume the correct thickness when it is contorted into the correct curvature. In the simplest circumstance, where the layers are flat, the fabrication material is simply deposited in a uniform thickness for each layer.

Figure 4D:
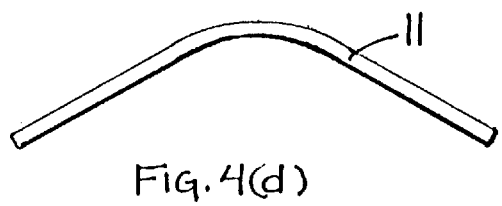
FIG. 4(d) is a cross sectional view of a sheet of fabrication material position on a curved support or stack.
Figure 4E:
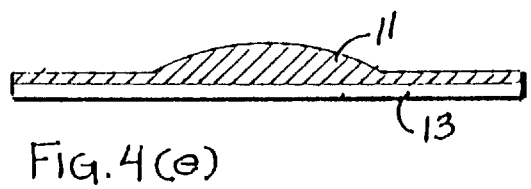
FIG. 4(e) is a side elevational view of a layer used to achieve the curvature depicted in FIG. 4(d).

FIG. 4(d) shows a cross section of a layer of fabrication material 11 as it might lie after being affixed to a stack. This layer is shown to have approximately uniform thickness and to be nearly flat near the edges, but have considerable corvature near the center. FIG. 4(e) shows an example of a layer that could be formed in order to yield the final shape and thickness shown in FIG. 4(d). In FIG. 4(e), the layer is formed on a flat substrate so that it's bottom surface is flat. The center region of the layer is formed with a greater thickness than the edge regions becasue when the layer is bent into the correct final shape shown in FIG. 4(d) the material in the center region will become spread out due to the stretching induced by the curvature. This spreading out causes the material in the center region to become thinner after being bent into shape than it was when it was lying flat. A Mathematical calculation may be performed to determine the correct thickness to deposit at each point on the substrate in order to yield the correct final thickness at each position after the layer takes on the correct final shape. Such a mathematical description is called a "function". It may be desireable to calculate such a mathematical function for each layer which I will assume on the stack a curvature which if different from the curvature in which it was formed.

Method of depositing fabrication material. The fabrication material may be deposited on the substrate by any of several methods, such as:

(1) Spraying in the proper pattern and thickness, as with an ink jet mechanism.

(2) Extruding the material through a nozzle robotically guided over the surface of the substrate to form the proper pattern and thickness.

(3) Using a laser printer to deposit fabrication material on a laser-printable image transfer film, such as Press-n-Peel™ from Techniks Inc. of Ringoes, N.J. This transfer film can be run through a laser printer, and accepts an image from the printer just as a piece of paper does. However, the film is designed to allow the image to be removed from the film by the application of heat. In this technique, the film serves as the substrate, a laser printer mechanism forms the individual fabrication layers, and a heating element in the stacker is used to effect the transfer of the fabrication material from the transfer film to the stack.

(4) Coating of the substrate with the desired material, followed by cutting through this coating in the pattern of the closed curves in the logical layer. The cutting may be accomplished by a knife blade, a laser beam, a heated element, a fluid jet, or any other means capable of cutting the material cleanly without cutting so far into the substrate as to damage the structural integrity of the substrate. After cutting, the material lying on the substrate that is not to be part of the desired object (the "negative material") may be removed from the substrate or it may be left in place to be removed by "substrate weeding." These options are described below under Weeding.

(5) Or any other means or process capable of distributing the desired material in the desired pattern and thickness on the substrate.

The method of depositing the fabrication material is an automatic process acting under instructions based on the data packages of the logical layers. For some materials, it is possible to buy the fabrication material already coated on a substrate, in which case it is only necessary to cut the outline of the layer into the material. Some examples of such materials include adhesive-backed foams and films, such as Calon® II cast vinyl film from Arlon of Santa Ana, Calif., ScotchCal™ films from 3M Company of St. Paul, Minn., and sandblast stencil material from Anchor Continental, Inc. of Columbia, S.C.

Reducing layer-to-layer "graininess". Some methods of depositing fabrication material may allow control of the slope of the edges of the fabrication material deposited. For example, when cutting a pattern in a coating on the substrate, the cutting implement may be rotated to cut on an angle so that the edge surface of the material is not perpendicular to the large surfaces. If the edge is made with a slope such that, after bonding, the corners of the edge meet the corners of the edges of both the next previous layer and the next following layer, then the result may be a smoother surface than if the edge were made perpendicular.

Weeding. In a Carried-Sheet fabricator (a Conveyed-Adherent fabricator of the hybrid variety) one must separate the negative material from the positive. Borrowing from sign-cutting terminology this may be called "weeding" because it is the removal of unwanted material. The boundary between the positive and negative materials is established by the cutting process. After a boundary is cut, one has a choice. One may remove the negative material from the substrate before conveying the substrate to the stack. Because this is done by a special mechanism, it is called "mechanical weeding." Alternatively, one may in certain circumstances leave the negative material on the substrate so that it is conveyed to the stacker along with the positive material. The circumstances in which this is permissible are when one knows for certain that the positive and negative material will separate when the substrate is peeled away from the stack, with the positive material adhering to the stack and the negative material remaining on the substrate. This method of separating out the negative is called "substrate weeding."

There are several factors that can hamper weeding, such as (a) negative overlap, in which the negative region of the current layer touches some part of the stack, (b) cross-boundary linking, which is caused by molecular interactions between the positive and negative material across a cut line, (c) friction or collision of edges, where the edges of the negative and positive material rub against or catch on each other, (d) an error in alignment of a layer with respect to the stack, which can cause negative overlap to occur in a case where it should not, and (e) shear forces imparted on the fabrication material by the platen system.

In negative overlap, the negative region of the current layer touches some part of the stack, so that the corresponding negative material, if not specially handled, might adhere to the corresponding part of the stack. If the adhesive contact is strong enough to pull the negative material off the substrate, this defeats substrate weeding.

Figure 3C:
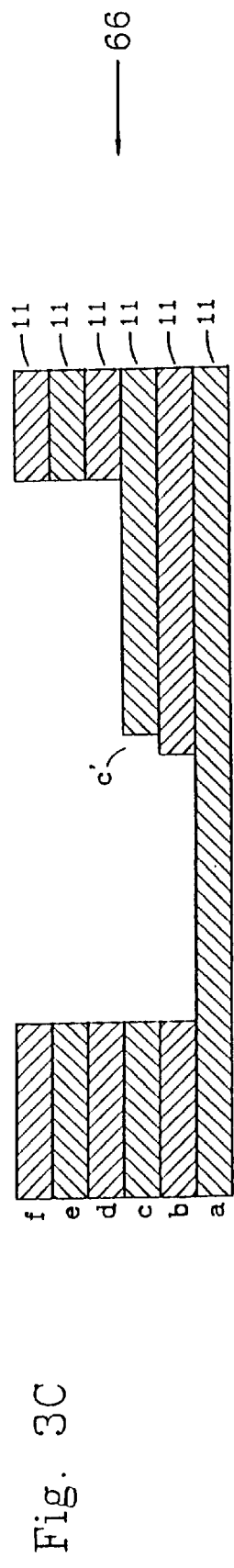
FIG. 3(c) is a cross-sectional view of a stack consisting of several layers of fabrication material bonded together, including layers between which there is negative overlap.

FIG. 3(c) illustrates negative overlap. Layers e and f do not exhibit any negative overlap, and these layers are therefore good candidates for substrate weeding. Each of layers b, c, and d has a negative region that touches the material of the layer below it in the stack. For layers b and d this contact is substantial and most likely requires special processing, such as mechanical weeding or selective adhesion neutralization. Layer c is a borderline case since its negative region has a small overlap c' with the underlying positive region of layer b. Whether this small region of overlap requires special processing depends on the strength of adhesive contact developed between the negative material and the stack and on how this adhesive contact compares with the adhesive contact between the negative material and the substrate 13.

Figure 5A:
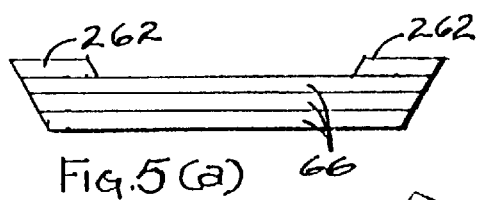
FIGS. 5, sub parts (a) through (g) are a series of cross-sectional views of a stack illustrating weeding theory.
Figure 5B:
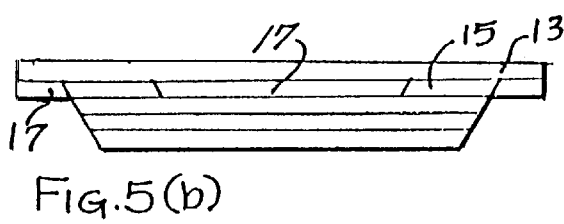
Figure 5C:
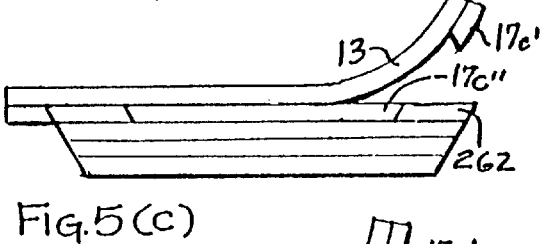

Another illustration of negative overlap is provided in FIGS. 5(a) through 5(g). In building the coffee cup 10, negative overlap arises in the bottom layer 10a' of the walls 10a of the cup, which is the first layer above the top layer 10d' of the base of the cup, as shown in FIG. 2(b). The correct fabrication of this portion of the cup is shown in FIG. 5(a), where the new fabrication material 262 of the bottom layer of the walls is shown properly affixed to the stack 66 of layers constituting the base of the cup. In this correct procedure, the interior of the walls 10a is void of material. However, if the new layer is simply cut and placed on the stack in the correct position, as shown in FIG. 5(b), then the negative material 17 in the interior of the walls will adhere to the stack 66, and will not come off by substrate weeding. When substrate 13 is peeled from stack 66, portion 17c' of the negative material is properly substrate weeded, portion 17c'' remains adhered to the stack in error, as is shown in FIG. 5(c). FIG. 5(b) and FIG. 5(c) therefore illustrate an incorrect procedure. The problem with negative overlap is that it can interfere with substrate weeding. The ways to deal with this problem include mechanical weeding (FIG. 5(d) and FIG. 5(e)) and selective adhesion neutralization (FIG. 5(f) and FIG. 5(g)).

Figure 5D:
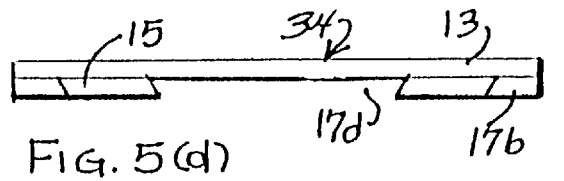
Figure 5E:
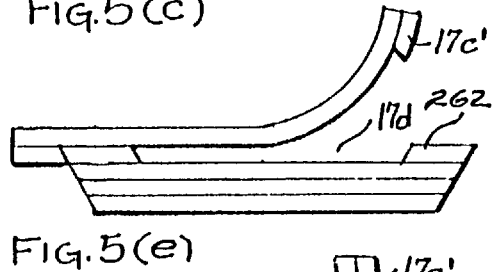

In mechanical weeding, selected negative material 17 is mechanically removed from substrate 13, leaving void 17d, as shown in FIG. 5(d). (Example devices for performing this function are illustrated in FIG. 7 and explained below.) When overlapping negative material has been removed by mechanical weeding and then the fabrication medium 34 is conveyed to the stacker, substrate weeding is able to work on remaining negative material 17c', and the proper void 17d is left in the place of the overlapping negative material, as shown in FIG. 5(e).

Figure 5F:
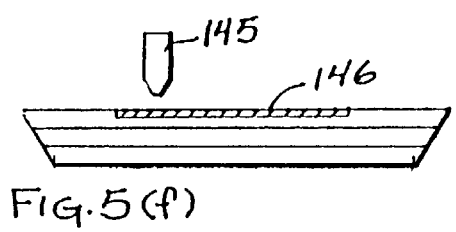
Figure 5G:
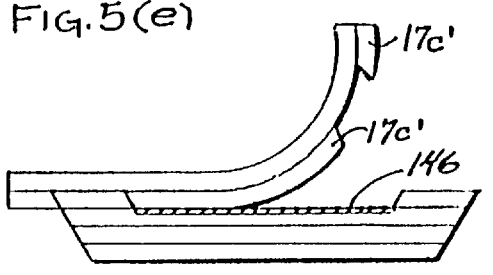

Selective adhesion neutralization refers to an action taken on either the overlapping negative material 17 or the portion of the top layer of the stack 66 with which it overlaps, which action reduces or eliminates the adhesive interaction between the materials. FIG. 5(f) shows an adhesion neutralizer 145 acting on the problem portion of the top layer in this way. The neutralizer is mounted on an automatic device (not shown) that aims it so as to neutralize a selected region (e.g. a region overlapped by a negative region of the next layer). The neutralizing action might consist of coating over the surface of a tacky material, or depositing a reagent that causes a tacky component to cross-link and therefore loose its tack, or irradiating a material to stimulate cross-linking, or applying an agent and/or action (such as rubbing) to the surface of a material to remove or disable an adhesive component of the material, or any other means of reducing or eliminating the adhesive interaction between the materials. Some example devices for adhesion neutralizer 145 are as follows: If the neutralizing action involves coating with or otherwise depositing or applying a material or agent, then adhesion neutralizer 145 may be a conventional printing device, an ink-jet head or other aimed spraying device, a robotically guided extrusion or tape-laying device, or any other device capable of depositing or applying the material or agent selectively in the problematic region. If the neutralizing action involves irradiation, then adhesion neutralizer 145 may be a laser beam, or an LED array, or a lamp shining through a mask, or another means of selectively applying the proper kind of radiation. After the material 146 has been treated in this way, substrate weeding may be used because the problem materials will no longer adhere. Negative material 17c' remains on substrate 13, even the negative material from the interior of the walls. When negative material comes into contact with adhesion-neutralized surface 146, it does not adhere and so is removed by substrate weeding, as is shown in FIG. 5(g). Thus, the correct result shown in FIG. 5(a) can be obtained either by mechanical weeding, in which case FIG. 5(a) is subsequent to FIG. 5(e), or by selective adhesion neutralization, in which case FIG. 5(a) is subsequent to FIG. 5(g).

Cross-boundary linking is another factor that can hamper weeding. This is caused by molecular interactions between the positive and negative material across a cut line. It is, in effect, an attempt by the material to "heal" the cut. Cross-boundary linking is a problem because it tends to fight against weeding by causing the positive and negative material to hold to each other. There are three ways this problem occurs. (a) In substrate weeding, when the substrate is peeled off the stack cross-boundary linking can cause negative material to remain with its adjacent positive material instead of staying on the substrate. (b) Conversely, it may cause the material of a small positive region to remain on the substrate with its surrounding negative material instead of adhering to the stack. Or (c), in mechanical weeding, when negative material is peeled from the substrate, cross-boundary linking can cause the adjacent positive material to come off with it instead of staying on the substrate. Notice, in case (a) it is negative material that is misbehaving, while positive material is the problem in cases (b) and (c). In cases (a) and (c), the problem is material being pulled unintentionally off of the substrate, while in case (b) it is material being pulled unintentionally off of the stack. Whether these problems occur is governed by a relationship between the (i) strength of adhesion between the material in the problem region and either the substrate or the stack, and (ii) the strength of cross-boundary linking. In a region with a small dimension, such as a small circle or a long, thin strip, there is a relatively large perimeter per unit surface area, and therefore cross-boundary linking tends to be a greater problem.

Substrate weeding is preferred over mechanical weeding because substrate weeding takes no additional time to perform. But substrate weeding can only be used when one knows for certain that the positive and negative material will separate when the substrate is peeled away from the stack. This is the case unless one of the following conditions holds:

There is a negative region with a small dimension such that cross-boundary linking will hold it to the adjacent positive material, thereby pulling it unintentionally off of the substrate. In this case, it is better to use mechanical weeding (FIG. 7, and explained below), so that the negative material is removed from the substrate before the substrate is conveyed to the stacker.

There is a positive region with a small dimension such that cross-boundary linking will hold it to the adjacent negative material, thereby holding it unintentionally on the substrate. This case is handled by using a method of selective adhesion activation (FIG. 8, and explained below).

The negative region of the current layer touches part of the stack (negative overlap), so that the current negative material might become adhered to the stack and therefore be pulled off the substrate. In this case, one may use either mechanical weeding (FIG. 7, and explained below) or selective adhesion neutralization (FIG. 5(g), and explained above).

III Affixing the Layers

Each layer is conveyed on the substrate to a stacker where it is brought into contact, in correct position, with and affixed to a stack of previously-affixed layers (except for the first layer, which is affixed to a base in the stacker) to form the three-dimensional object.

Method of bonding the layers. The bonding of a new layer to the stack may be by any of several mechanisms, such as:

(1) The inherent cohesiveness of the fabrication material.

(2) An adhesive component of the fabrication material.

(3) A physical process, such as heat-induced diffusion or melting of the fabrication material at the interface between the new layer and the stack.

(4) A chemical process, such as curing of the fabrication material or a component thereof.

(5) A "cold welding" process, such as self-propagating high-temperature synthesis (SHS), combustion synthesis, self-propagating solid state precursor reactions, or solid state metathesis, as described in Rapid Solid-State Precursor Synthesis of Materials by John B. Wiley and Richard B. Kaner in Frontiers of Materials Science, Feb. 28, 1992, pages 1093..7, or in Fundamentals of the SHS Joining Process by Robert W. Messier, Jr. and Timothy T. Orling in Materials Research Society Symposium Proceedings, v. 314, 1993, pages 177.82. Such processes may be applicable to fabrication of metals, ceramics, and exotic composites.

(6) Magnetism, if the fabrication material is a magnetic material, such as Koroseal® flexible magnetic sheeting from RJF International Corporation of Cincinnati, Ohio.

(7) Or any other means or process that causes the layers to bond to each other.

The method of bonding may also involve pressing, rolling, and/or other ancillary operations to enhance the bonding achieved.

Releasable bonding. Typically, the bonding will be permanent, but it is not necessarily so. It is also useful to use a bonding method that is capable of being released and reactivated. After fabrication of the desired object, the object may then be separated into sections. These sections may then be inspected for educational or demonstration purposes and then reassembled to reform the complete object. An example of a type of bonding that allows this sort of behavior is cohesion of a highly plasticised vinyl, such as is used in the manufacture of Stik-ees® glueless plastic decals by Stik-ees of Vista, Calif. Such cohesion is strong enough to hold together a complete object, but is capable of being released by moderate force along the interface between the layers, and is capable of being reactivated simply by bringing the separated sections back into contact, as long as the surfaces have remained clean during their separation. Another example of a material that would allow separation and reassembly at a cross section is magnetic sheeting, such as Koroseal®, mentioned above.

Removal of substrate. After bonding, the substrate is removed from the new layer in preparation for the bonding of the next following layer. The characteristics of the materials and bonding processes must be such that removal of the substrate does not strain the inter-layer bonding to failure.

Use of negative material as support. In a hybrid process, when an object has a gently sloping, narrow, wall, which might tend to collapse in the fabrication process, that wall can be supported by negative material adjacent to it, simply by leaving the negative material in place during fabrication, instead of removing it. Since the wall is only sloping gently, there will not be a great deal of contact between each layer of the stack and the negative material of adjacent layers, so the support structure will fall away easily after the fabrication is complete. A cantilever can be supported by negative material in a similar way, but, since there will be a great deal of contact between the negative material and the first layer of the cantilever, the top layer of the support structure should be treated by selective adhesion neutralization or formed from a nonadhesive material, such as ordinary paper of the same thickness as the fabrication material. This nonadhesive material can be treated exactly as a sublayer, as discussed above under Methods of varying material composition. In an additive process, material can be added in selected negative regions to provide the same manner of support just described for a hybrid process.

Insertion of foreign object. The fabrication process may be interrupted at any point to insert a mechanism, electronic circuit, or other foreign object into a void in the partially fabricated object. The fabrication process is then resumed.

Holding the first layer. The first layer of the desired object is formed on the substrate in the same fashion as every other layer. However, there is no stack for it to align with and bond to. Thus, the fabrication process must provide a base for the first layer to be held to. This holding must be strong enough to support the entire desired object through the fabrication process, yet it must also be capable of being released when the fabrication process is complete (unless it will be desired to leave the object affixed to the base). The method of holding may be by an adhesive that is less strong than any adhesive used between the layers, or by vacuum, or by magnetism, or by any other means or process capable of holding the first layer strongly enough, yet capable of being released. If a hybrid fabrication process is being used with substrate weeding, then the base should have voids in it to match the negative region of the first layer. This can be accomplished by cutting the base material with the same pattern as the first layer of fabrication material.

Providing for curvature of the first layer. The surface provided for the first layer to be held to must have the correct curvature to match the curvature of the first layer. If the first layer is not flat, then special effort is required to provide a base object with such a surface. However, this is not a difficult problem because the same fabrication equipment that will be used to build the object can first be used to build the base object with the proper curvature as its outermost surface. This base object can be fabricated with holes to convey vacuum pressure, or it can be coated with an appropriate adhesive, or it can be subjected to some other process to prepare it to hold the first layer of the new object to be fabricated. Another way to provide for the curvature of the first layer would be to use one of the techniques listed above for providing curvature of the substrate, such as a crepe-paper-like material manipulated by robotically controlled fingers, or a stretchable plastic manipulated by electromagnetically controlled rods.

Apparatus

Detailed Description of an Example Carried-Sheet Fabricator

Figure 6A:
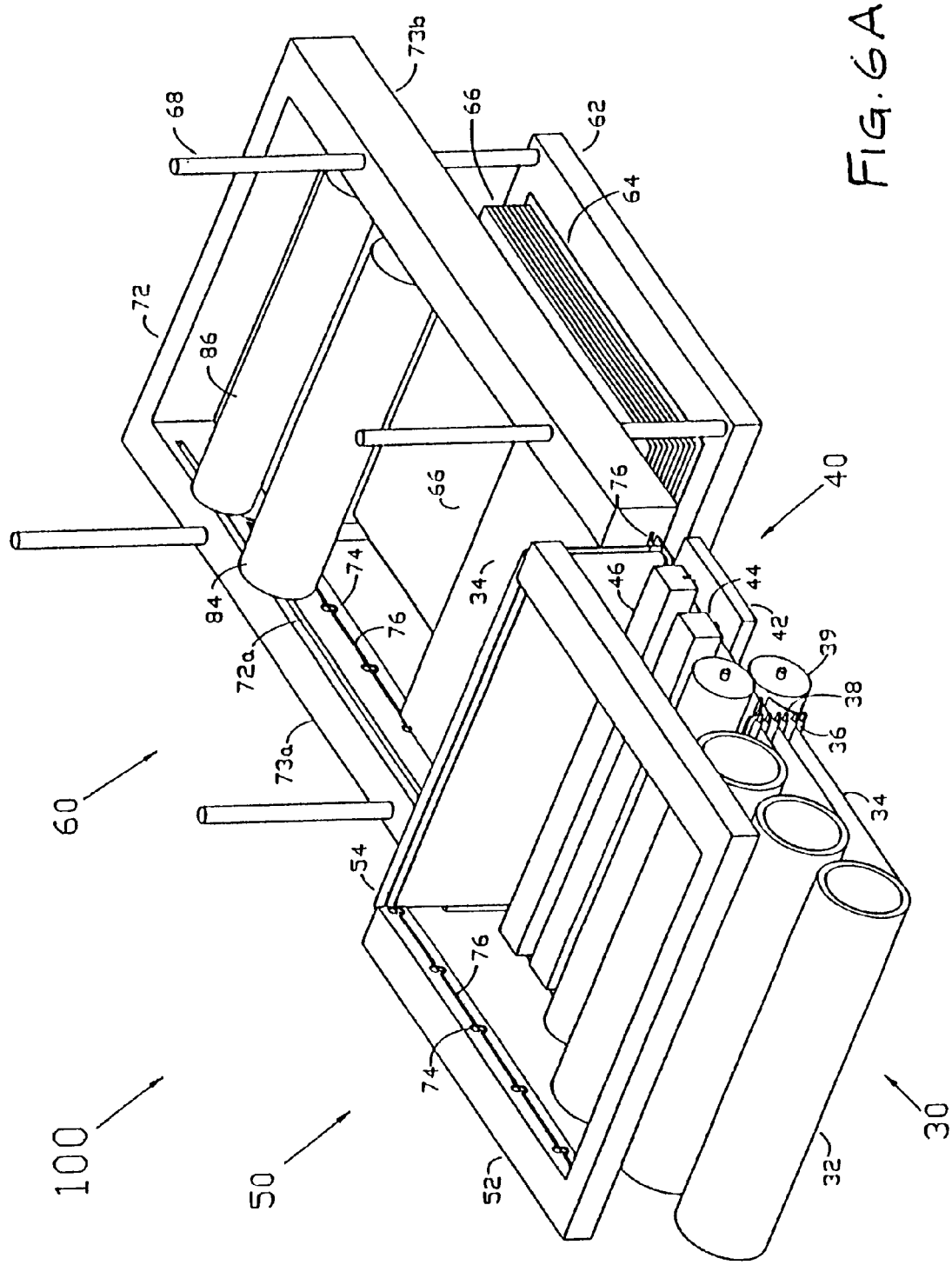
FIG. 6A(a) is a perspective view of an example Carried-Sheet fabricator used to form and assemble the layers of fabrication material. In this example fabricator, the fabrication medium is supplied on rolls.
Figure 6A:
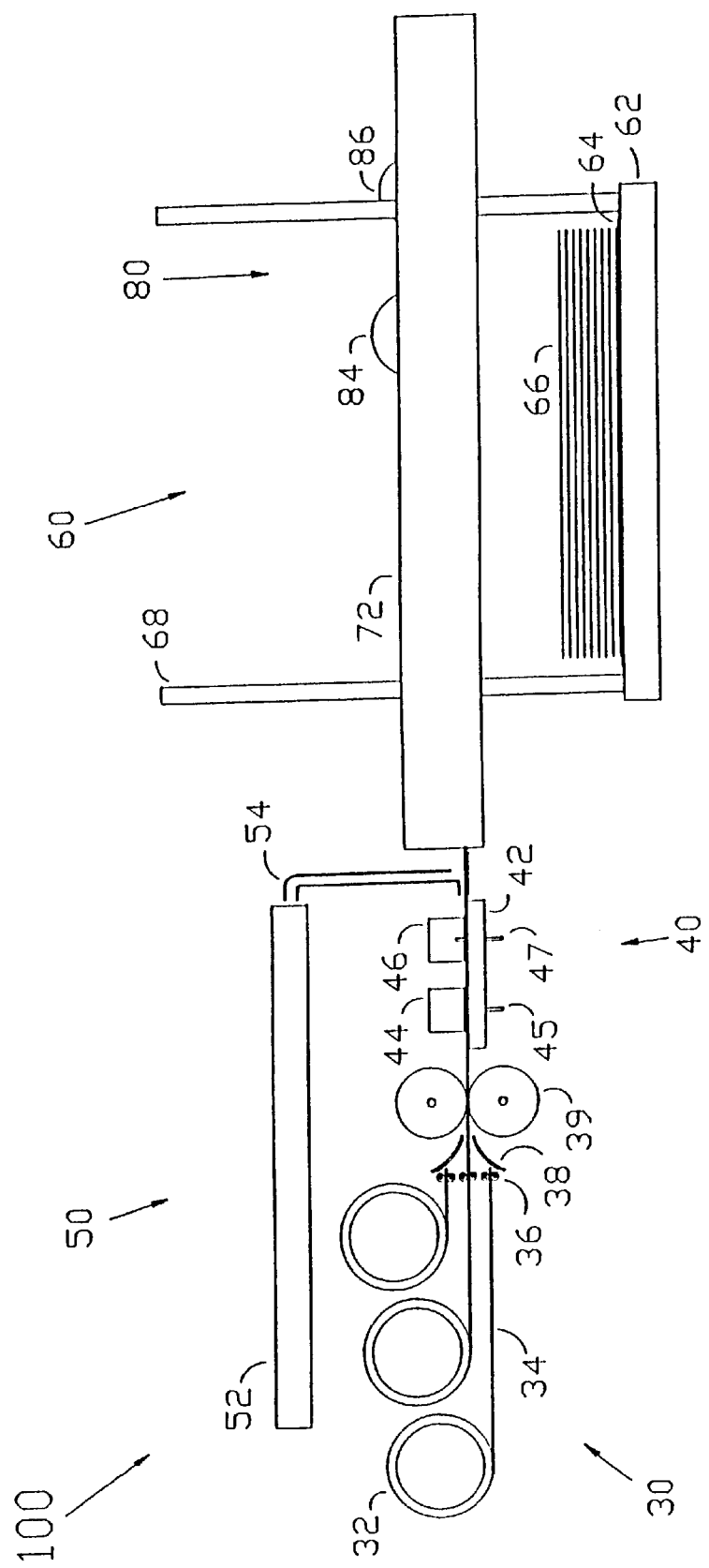

A fabrication medium 34, including a substrate 13 and a fabrication material 11, which may consist of sublayers 11a and 11b, where sublayer 11b may be an adhesive, may be used with the fabrication unit 100 shown in FIG. 6A. A roll of adhesive-backed vinyl or other film on paper or other substrate is suitable. As depicted in FIG. 6A, three rolls 32 of fabrication medium 34 may be used. The fabrication medium 34 from one of the three rolls 32 is selectively fed by selector rollers 36 into material selector funnel 38, and then by feed rollers 39 to a cutter assembly 40 where an outline of a layer is cut into the fabrication material 11 without cutting through the substrate 13. This cutting process is similar to that performed by a sign-cutting plotter, such as the CAMM-1 professional sign cutter from Roland Digital Group of Irvine, Calif., or the Signmaker® automated lettering system from Gerber Scientific Products of Manchester, Conn. After the outline of a layer is cut in the fabrication material, the fabrication medium is sliced to yield segment 34a containing the fabrication material of that layer (FIG. 6C).

Figure 6B:
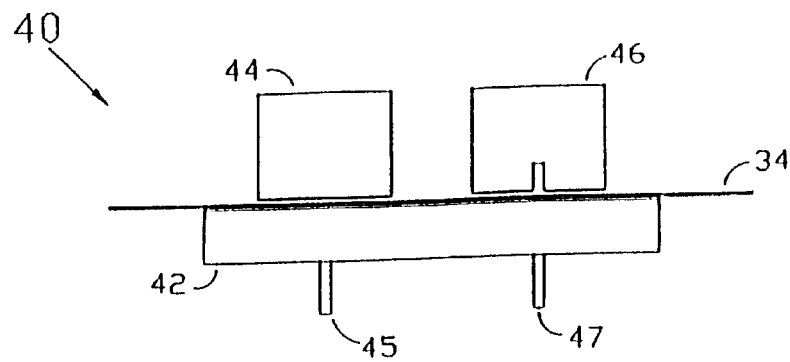
FIGS. 6B(a) through (c) show several subsystems of the example Carried-Sheet fabricator of FIGS. 6A(a) and (b), where FIG. 6B(a) is a side view of the cutter assembly of the fabrication unit shown in FIG. 6A(a), FIG. 6B(b) is a perspective view of the stacker of the fabrication unit shown in FIG. 6A(a), and FIG. 6B(c) is a perspective view of the roller assembly of the stacker shown in FIG. 6B(b).
Figure 6B:
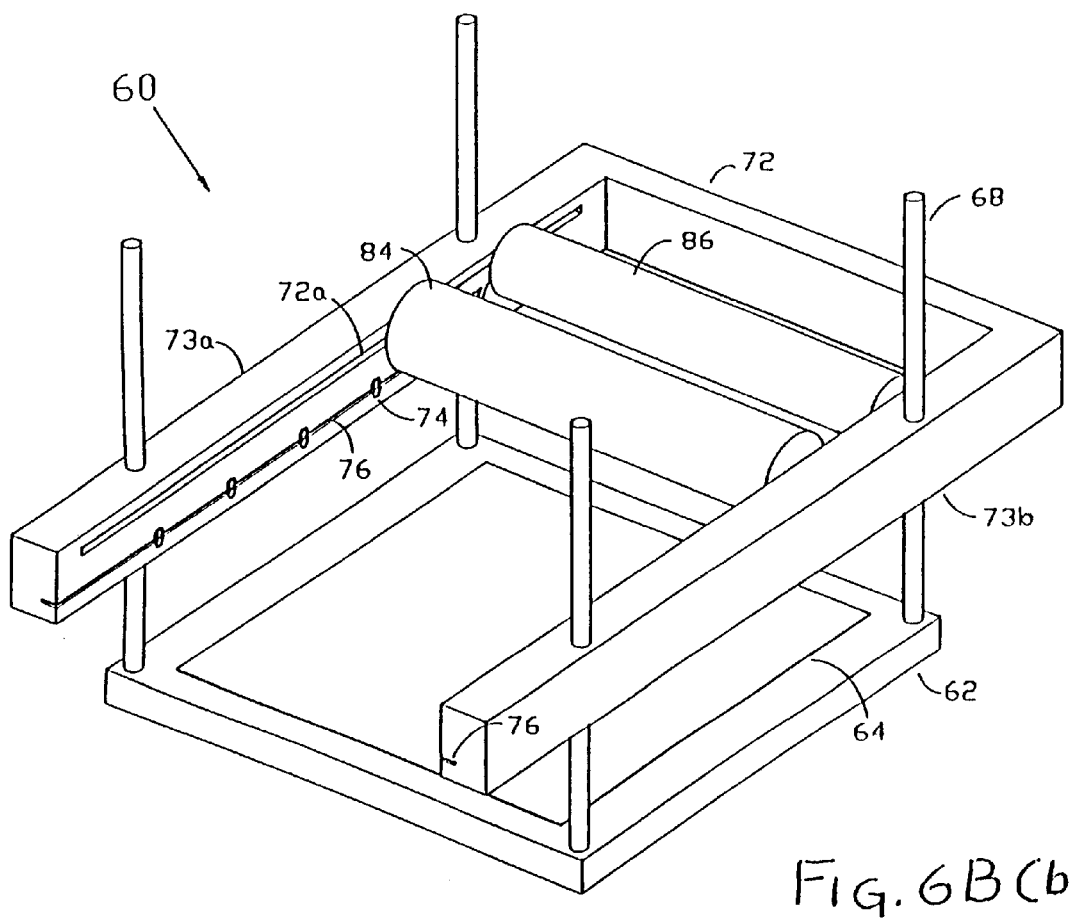
Figure 6B:
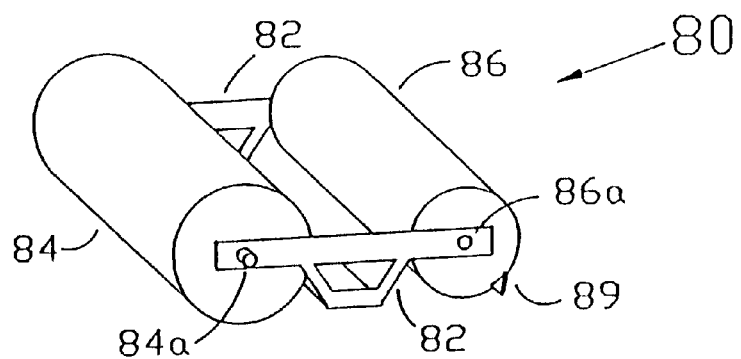
Figure 6C:
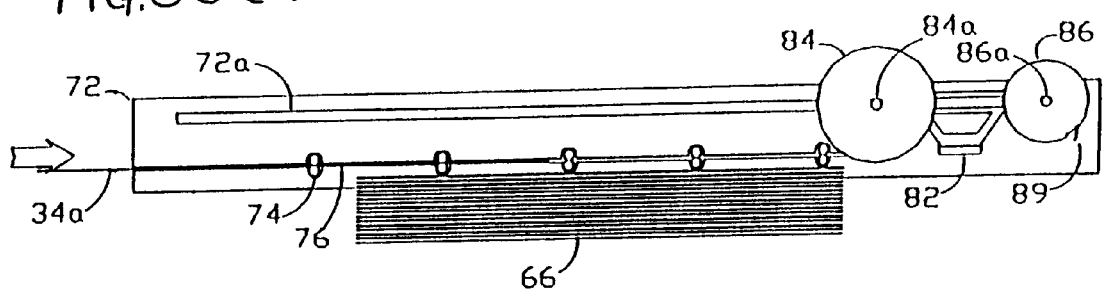
FIGS. 6C, sub parts (a) through (e), are cross-sectional views of the action sequence of the stacker of FIG. 6B(b), where FIG. 6C(a) shows a segment of fabrication medium initially advancing into the stacker, FIG. 6C(b) shows the fabrication medium aligned in correct position with respect to a stack of previously aligned and bonded layers of fabrication material, FIG. 6C(c) shows the roller assembly moving across the aligned fabrication medium in order to transfer the positive material from the fabrication medium to the stack (the substrate and negative material on its surface are wound up on one of the rollers of the roller assembly), FIG. 6C(d) shows the completion of the transfer of fabrication material to the stack, and FIG. 6C(e) shows the roller assembly returning to its starting position.
Figure 6C:
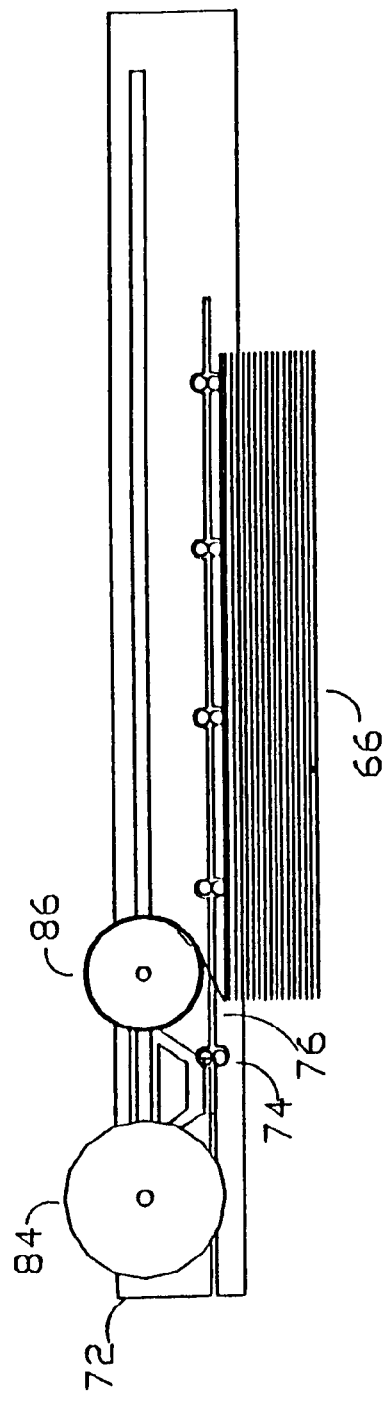
Figure 6C:
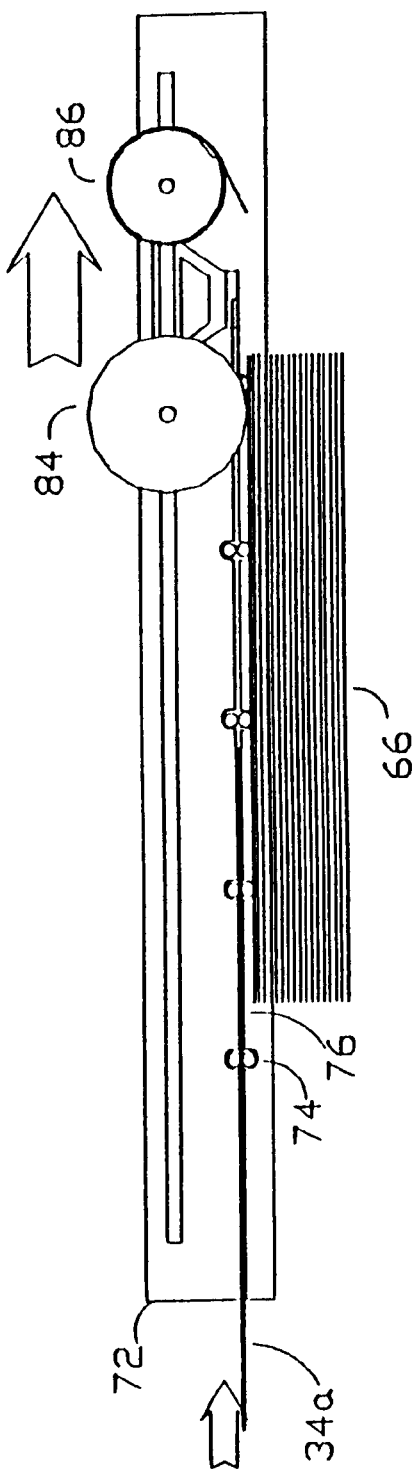

As best shown in FIG. 6B(a), the cutter assembly 40 has base 42 which supports the fabrication medium 34. The fabrication medium 34 is fed between a contouring base 44 and a knife blade 45 which cuts the outline of the layer but does not cut into the substrate 13. The feed rollers 39 next advance the fabrication medium 34 between a slicing base 46 and slicing knife blade 47 which slices the medium into segments. Each segment carries a cut outline of a layer corresponding to a data package, including a positive region and a negative region. In certain situations, a weeder 50 (FIG. 7) engages negative material and strips it from the substrate prior to the segment 34a being advanced to the stacker 60.

After the cutting and weeding operations, the fabrication unit 100 advances the segment 34a to the stacker 60. As depicted in FIG. 6B(b), the stacker 60 comprises a U-shaped frame 72 with a roller assembly 80, including a pair of rollers 84 and 86 attached to a bracket 82 that moves within the frame 72 across a platform 62 which supports the stacked layers 66 of fabrication material 11. Four posts 68 at the corners of the platform 62 support the frame 72. The axles 84a and 86a, respectively, of the rollers 84 and 86, move along a slotted track 72a (FIG. 6C(a)) in the opposed arms of the frame 72.

The segment 34a is advanced by a series of edge-holding rollers 74 to align it in correct position with respect to the stack 66 of fabrication material. The opposed lateral edges of the fabrication medium 34 move along opposed channels 76 in the arms 73a and 73b of the frame 72. The edge-holding rollers 74 grasp the lateral edges, feeding the fabrication medium along the channels 76 until the segment 34a is aligned correctly with the stack 66.

The take-up roller 86 has a clamp 89 which grasps the forward end of the segment 34a as the roller assembly 80 moves to the left as viewed in FIG. 6C. As the roller assembly 80 moves to the left, the lay-down roller 84 presses the fabrication medium against the stack 66 so that the positive material 15 on it bonds to the stack. Substrate-weeded negative material 17c' remains on the substrate 13. The substrate 13, together with any substrate-weeded negative material 17c', becomes waste sheet 34b, which has its forward edge grasped by the clamp 89 and wound about the take-up roller 86 as depicted in FIG. 6C(c). When the roller assembly 80 has moved all the way to the left as viewed in FIG. 6C(d), all of the waste sheet 34b has been taken up on the take-up roller 86. The roller assembly 80 is then moved again to the right, where waste sheet 34b is removed and discarded. The stacker 60 is then ready to receive the next segment of fabrication medium 34.

Weeder

FIGS. 7A(a)–(c) shows one example of a mechanism for weeder 50. Weeder 50 mechanically removes ("weeds") negative material 17 from substrate 13 before fabrication medium 34 is conveyed to stacker 60. Fabrication medium 34 is seen in cross section, being conveyed from the formation station to the stacker. Boundary cuts 17a have been cut into fabrication material 11 at the formation station, dividing fabrication material 11 into positive material 15 and negative material 17. A continuous supply of a pickup-up film 58 is provided, on which the surface facing fabrication material 11 is capable of being adhered to fabrication material 11. Adhesion activator 56 is provided which is capable of activating this adhesion such that the adhesion does not take place except where adhesion activator 56 is engaged. As fabrication medium 34 advances toward the stacker, adhesion activator 56 is engaged when a new region of negative material 17 passes under adhesion activator 56, causing pick-up film 58 to adhere to negative material 17. Pick-up film 58 is then caused to move in unison with fabrication medium 34, and negative material 17c' is thereby lifted off of substrate 13, leaving void 17d.

In FIG. 7A, adhesion activator 56 is illustrated as a plunger, pick-up film 58 is shown to be held a small distance away from fabrication material 11, as shown in FIG. 7A(a), and engagement of adhesion activator 56 consists of moving the plunger toward fabrication material 11, as shown in FIG. 7A(b). In this case, the method of adhesion of pick-up film 58 to fabrication material 11 is by a pressure sensitive adhesive coated on the surface of pick-up film 58 facing fabrication material 11, and the adhesion is activated by pressure provided when the plunger moves toward fabrication material 11, which presses pick-up film 58 against fabrication material 11. The plunger may be activated by a solenoid, by a piezo-electric element, by a mechanical cam, or by any other mechanism capable of moving the plunger toward the fabrication material. Other methods of adhesion may be used. For example, pick-up film 58 may be coated with a thermally activated adhesive, and adhesion activator 56 may be a heating device, such as is used in the print head of a thermal transfer printer. After a piece of negative material 17 has been adhered to pick-up film 58, fabrication medium 34 and pick-up film 58 are moved in unison, as shown in FIG. 7A(c), to allow negative material 17 to be peeled off of substrate 13 and collected on pick-up film 58. Negative material 17 thereby becomes successfully weeded negative material 17c', leaving void 17d in fabrication medium 34.

Adhesion activator 56 may be a single-point device which scans fabrication material 11, being engaged while passing over a negative region and not engaged while passing over a positive region, thereby causing negative material to be adhered to the pick-up film while leaving positive material unaffected. Or adhesion activator 56 may consist of an array of single-point devices which span the entire width of fabrication material 11 and are selectively engaged based on which single-point devices have negative material under them at any one time. Alternatively, adhesion activator 56 may consist of a partial array of single-point devices which span only part of fabrication material 11 and scan fabrication material 11 in order to provide adhesion to the pick-up film wherever required. The single-point devices in the partial array may be tightly spaced, so that scanning activates adhesion in successive disjoint regions, or the single-point devices may be loosely spaced, so that scanning activates adhesion in overlapping regions. When the method of adhesion is by a pressure sensitive adhesive, a tightly-spaced partial array of plungers could be similar to a print head used in a dot-matrix printer.

Still another design for adhesion activator 56 calls for a separate device, not shown, which selectively treats fabrication material 11 to make it susceptible to pick-up film 58

(such as by selectively depositing an adhesive material or agent). In this case, pick-up film 58 does not adhere to raw fabrication material 11, but it does adhere to the treated portion of fabrication material 11. (For example, if the treatment device deposits a pressure sensitive adhesive on selected regions of fabrication material 11, then pick-up film 58 might be a plastic or paper sheet that is attracted to this adhesive.) In this design, adhesion activator 56 does not need to be selective in its action, but may exert its influence across the entire surface of fabrication material 11; what determines which portions of fabrication material 11 become adhered to pick-up film 58 is the selection of regions that have been treated by the treatment device. As pick-up film 58 passes over fabrication material 11, it picks up those regions of fabrication material 11 which have been treated, and it has no effect on regions which have not been treated. However, the treatment need not be applied to every point of a contiguous region to be weeded; it may be sufficient to treat just enough of the region to allow the pick-up film to get a hold of the region so that the rest of the contiguous region will follow by its innate attachment to the treated region.

FIG. 7B shows an alternative mechanism for weeder 50, which may be used for weeding small regions. This mechanism includes a movable weeding tool 152 on which is mounted sharp needle or barb 154, together with weed collector 250, as shown in FIG. 7B(a). Barb 154 has a bent shape or a hook shape to allow it to catch a small piece of material by being plunged into the material (FIG. 7B(b)). Weeding tool 152 is then raised with small piece 17c' of material caught on barb 154 (FIG. 7B(c)) and weeding tool 152 is moved to weed collector 250 (FIG. 7B(d)) which has removal device 252 and sink 254. Removal device 252 applies a force to remove the caught piece 17c' of material from barb 154 on weeding tool 152, as shown in FIG. 7B(e). A top view of an example weed collector 250 is shown in FIG. 7B(f). Sink 254 catches the removed piece 17c' of material for disposal. Removal device 252 is shown to work by having a shape that allows it to surround barb 154 and push down on the caught piece 17c' of material. But other types of removal devices would work as well. For example, an alternate design of removal device may suck piece 17c' of material off of barb 154 by vacuum, or blow it off by a stream of air pressure, or shake it off by vibration, or pull it off by adhesion, or dissolve it away by chemical action, or any other suitable means.

Selective Adhesion Activation

A feature with a small dimension, such as a small circle or a long, narrow strip, can cause a problem due to cross-boundary linking. As discussed under Weeding, cross-boundary linking can cause such a feature to cling to its adjacent negative material. When using substrate weeding, this may tend to lift the feature off the stack again after it has been laid down. To prevent this problem, one can use a device to selectively activate adhesion of the particular feature to the stack.

The method of activating adhesion depends on the mechanism of adhesion at work in the fabrication materials being used. For example, if one component of the fabrication material is a pressure-sensitive adhesive, then adhesion is activated by pushing the material of the feature against the stack. If the fabrication material is adhered by a heat-sensitive adhesive, then adhesion is activated by applying heat to the feature.

FIG. 8 shows the use of selective adhesion activation. Adhesion activator 182 may be one of an array of elements mounted in the lay-down platen, or it may be an individual element or an array of elements mounted on a mechanism that is capable of moving it to any part of the top surface of stack 66. Alternatively, adhesion activator 182 may be a remotely scanned device, such as a laser beam, that transmits its effect to selected points on the top layer of stack 66. Adhesion activator 182 may be a plunger that applies a mechanical force if the fabrication material is adhered by a pressure-sensitive adhesive. Alternatively the activator may be a heating element if the fabrication material is adhered by a heat-sensitive adhesive. Or the activator may be another device appropriate to triggering the adhesion of the material.

Selective Adhesion Neutralization on Exposed Surfaces

Selective adhesion neutralization is described above as a technique that allows substrate weeding to be used in cases of negative overlap. There is another situation when it is also useful to use selective adhesion neutralization. When an object has been built in a Conveyed-Adherent fabricator, an exposed surface may be sticky because of tackiness utilized on surfaces in some implementations of the process. It would be desirable to reduce or eliminate the tackiness on those portions of each layer which will be exposed in the final object. The techniques disclosed above for selectively neutralizing the adhesion of surfaces in a Carried-Sheet fabricator would apply equally well to this application.

FIG. 9 shows coffee cup 10 after it has been built in a Conveyed-Adherent fabricator using tacky surfaces, and before being removed from stacker base 64. In FIG. 9(a) up-facing surface 162 of walls 10a is still tacky, as is every up-facing surface during the build process. In FIG. 9(b), the adhesion of the up-facing surface of the walls has been neutralized so this surface 164 will not be sticky when the object is removed from the fabricator to be used. In this object, the top half of the handle also has regions at the outer edge of each layer and on the very top layer that also have exposed adhesive surfaces, but these regions are too small to be exhibited separately in this figure.

Stacking Theory

A stacker includes a system of one or more platens, which are devices that impart forces on the fabrication medium to enact lay-down and/or peel-off. The stacker also includes a system of one or more holding devices, which control the motion and tension of the fabrication medium during lay-down and peel-off. The holding system may include (a) a device that feeds fabrication medium to the stacker, (b) a device that takes up waste material from the stacker, (c) a system of one or more rollers that allows the fabrication medium to pass over them under tension from feed and/or take-up devices elsewhere, (d) a system of clamping or other holding mechanisms that holds one or more of the ends, edges, or other positions of the fabrication medium in order to control it, (e) a system of vacuum suction holes or cups, (f) or any other appropriate means to control the motion and tension of the fabrication medium, including combinations of the elements listed here or combinations of these elements with other means. If any portion of the holding system holds the fabrication medium rigidly to a platen, then the combination of that portion of the holding system and that platen is called a holding platen.

An example stacker is shown in FIG. 6B(b), with additional detail of its platen system shown in FIG. 6B(c). In this stacker, platen system 80 includes two platens: lay-down roller 84, and peel-off bar 88. The holding system consists of edge-holding rollers 74, which hold fabrication medium 34 in position for lay-down, and take-up roller 86, which pulls up waste sheet 34b against peel-off bar 88.

The simplest type of platen is a cylindrical platen, or roller. For any action of lay-down or peel-off performed by any kind of complicated platen system, it is sometimes useful to think of the particular local action being performed at the point of contact of the fabrication medium with the stack as if that local action were being performed by a simple roller. The radius of action is then defined as the radius of a roller that would provide approximately the same configuration of forces as are actually being applied.

The radius of action has several effects on the performance of lay-down and peel-off, including:

(1) The radius of action may affect how the forces of the platen are distributed between forces tangent to the stack surface and forces perpendicular to the surface. This may in turn affect the imposition of distorting stresses on the material of the stack, including the material of the current layer.

(2) For fabricating in curved layers, the radius of action must be smaller than the radius of curvature of the layers in order to allow the action to follow the curvature of the stack.

(3) To avoid trapping of air bubbles, the radius of action should be substantially less than the radius of curvature of the stack.

(4) To achieve incremental pulling in peel-off, so that the platen is not distributing its forces over a broad area, the radius of action must be smaller than the radius of curvature of the stack.

(5) If a holding platen is designed to hold the fabrication medium so that the pattern for an entire layer is mounted and exposed at one time, then the average radius of curvature of the platen must be at least equal to the length of the entire pattern divided by 6.28 (2 times pi).

Variations in stacking action. There are many variations in how the stacking (lay-down and peel-off) action may be performed. The following four examples illustrate choices in several aspects of the design of the system:

(1) Each platen may be a holding platen or a non-holding platen.

(2) A single platen may be used to perform both lay-down and peel-off, or multiple platens may be used. Multiple platens may be all similar (as in a system of rollers) or they may be dissimilar (as in a system which uses an arc platen for lay-down and a bar platen for peel-off).

(3) Peel-off for each layer may take place after lay-down for that layer is completed (consequent peel-off), or peel-off may begin while lay-down is in progress (concurrent peel-off). In the latter case, peel-off at each point on the stack may be approximately simultaneous with lay-down at that point (simultaneous peel-off), or peel-off at each point may be performed with some delay after lay-down at that point (delayed peel-off).

Consequent Peel-Off with One Holding Platen

Figure 10:
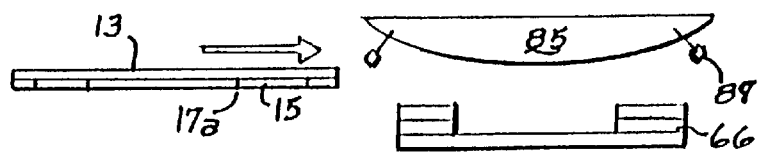
FIGS. 10A, sub parts (a) through (j), are cross-sectional views of the action sequence of an arc platen applying a layer of fabrication material to a stack using the method of consequent peel-off with one holding platen.
FIGS. 10B, sub parts (d) and (e), are cross-sectional views of the action sequence of an arc platen applying a layer of fabrication material to a stack using the method of simultaneous peel-off with one holding platen platen. Sub parts (a) through (c), and sub parts (f) and (g) are identical to the corresponding sub parts (a) through (c) and (f) and (g) of FIG. 10A.
FIGS. 10C, sub parts (a) through (d), are cross-sectional views of the action sequence of a system of rollers applying a layer of fabrication material to a stack using the method of consequent peel-off with a two-platen system.
FIG. 10D is a cross-sectional view of a stacker employing delayed peel-off with a multi-platen system.
FIGS. 10E, sub parts (a) through (e), are cross-sectional views of the action sequence illustrating simultaneous peel-off with a single roller.
Figure 10:
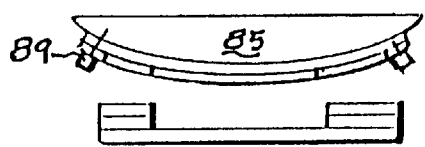
Figure 10:
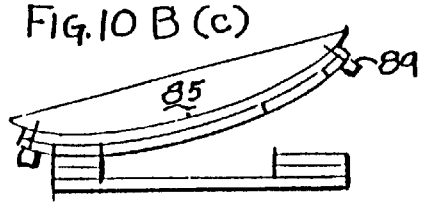
Figure 10:
Figure 10:
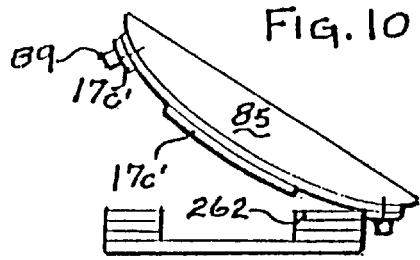
Figure 10:
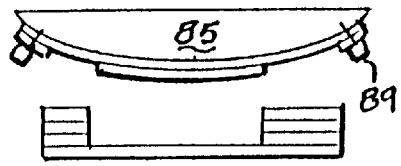
Figure 10:
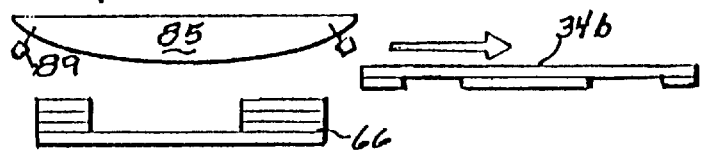

FIG. 10A shows a method of stacking in which holding platen 85 first presses fabrication material 34 onto stack 66, then platen 85 reverses direction to come back and pick up waste sheet 34b. Platen 85 is shown as a segment of a cylinder (arc platen), but other shapes may be used, as discussed under Design of platens. The holding system is shown as a pair of clamps 89, but other means may be used, as discussed under Design of holding system for a holding platen.

FIG. 10A(a) shows fabrication medium 34 being fed into the stacker. In FIG. 10A(b), fabrication medium 34 is held to platen 85 in the proper position by clamps 89. FIG. 10A(c) shows platen 85 moved towards stack 66 so that one edge of fabrication medium 34 comes into contact with stack 66. The next step is to release the one clamp 89 at the edge of fabrication medium 34 which is in contact with stack 66, as shown in FIG. 10A(d). In this way, fabrication medium 34 is free to fall off platen 85 as contact of fabrication medium 34 is extended across stack 66, as is shown in FIG. 10A(e). In FIG. 10A(f), fabrication medium 34 has been completely laid down, and substrate 13 is still in place on the back of the new layer of fabrication material 11, along with any negative material 17b which is intended to be removed by substrate weeding. Positive material 15 has become adhered to stack 66. When platen 85 moves back in the opposite direction, as shown in FIG. 10A(g), positive material 15 and substrate 13 separate, positive material 15 remaining adhered to stack 66 to become new layer 262, while substrate 13 and any negative material 17c' remain held to platen 85 and together become waste sheet 34b. When all of substrate 13 has been peeled off of stack 66, the one clamp 89 which was released is reengaged, as shown in FIG. 10A(h), and platen 85 is moved away from stack 66, as shown in FIG. 10A(i). Then FIG. 10A(j) shows waste sheet 34b removed from platen 85 for disposal.

Simultaneous Peel-Off with One Holding Platen

FIG. 10B shows a method of stacking in which holding platen 85 presses fabrication material 11 onto stack 66 and simultaneously picks up substrate 13 as it progresses. Platen 85 is shown as a segment of a cylinder (arc platen), but other shapes may be used, as discussed under Design of platens. The holding system is shown as a pair of clamps 89, but other means may be used, as discussed under Design of holding system for a holding platen.

FIG. 10B(a) shows fabrication medium 34 being fed into stacker 60. In FIG. 10B(b), fabrication medium 34 is held to platen 85 in the proper position. FIG. 10B(c) shows platen 85 moved towards stack 66 so that one edge of fabrication medium 34 comes into contact with the stack. Clamps 89 remain engaged everywhere as platen 85 is moved so as to extend contact of fabrication medium 34 across stack 66, as is shown in FIG. 10B(d). Therefore, as positive material 15 comes into contact with stack 66, it is pulled off substrate 13 onto stack 66 to become new layer 262, while substrate 13 and any negative material 17c' remain in place on the platen and together become waste sheet 34b. In FIG. 10B(e), fabrication material 11 has been completely laid down and adhered to stack 66, while waste sheet 34b is in place on platen 85. Platen 85 is then moved away from stack 66, as shown in FIG. 10B(f). Then FIG. 10B(g) shows waste sheet 34b removed from platen 85 for disposal.

Simultaneous Peel-Off with One Roller

FIG. 10E shows a method of stacking in which roller 84 presses fabrication material 11 onto stack 66 and simultaneously picks up substrate 13 as it progresses. In this method, roller 84 has only one clamp 89, which grips the leading edge of segment 34a of fabrication medium. The trailing edge of segment 34a is not gripped. Fender 782, which is mounted to the roller system by bracket 784, constrains segment 34a from flopping off of roller 84.

FIG. 10E(a) shows segment 34a of fabrication medium being fed into stacker 60. In FIG. 10E(b), segment 34a is held to roller 84 by clamp 89 while roller 84 advances towards stack 66. FIG. 10E(c) shows roller 84 beginning to apply new layer of fabrication material 11 to stack 66, while FIG. 10E(d) shows this new layer almost completely laid down. As positive material 15 comes into contact with stack 66, it is pulled off substrate 13 onto stack 66 to become new layer 262, while substrate 13 and any negative material 17c' remain in place on the roller and together become waste sheet 34b.

In FIG. 10E(d), trailing edge of segment 34a is supported by fender 782 to prevent it from flopping down onto stack 66 before roller 84 presses segment 34a into place against stack 66. In FIG. 10E(e), fabrication material 11 has been completely laid down and adhered to stack 66, while waste sheet 34b is dangling from roller 84. Next, clamp 89 will be released, allowing waste sheet 34b to drop into a waste receptacle (not shown).

Consequent Peel-Off with a Two-Platen System

FIG. 10C shows a method of stacking in which lay-down roller 84 first presses fabrication medium 34 onto stack 66, then peel-off roller 88b pulls up waste sheet 34b. The platens are shown as rollers, but other shapes may be used. The holding system consists of a pair of movable holding rollers 172 over which fabrication medium 34 passes and is connected to feed and take-up devices (not shown), but other means may be used. The platen system in FIG. 10C is similar to platen system 80 in FIG. 6B(c), except that the peel-off platen in FIG. 6B(c) is a bar platen (peel-off bar 88) instead of a roller.

In FIG. 10C(a), lay-down platen 84 is pressing down against the top surface of fabrication medium 34 in order to establish contact between fabrication material 11 and stack 66, while peel-off platen 88b is idle. The left-most holding roller 172 has been placed in a position below and to the left of the top of the left side of stack 66 in order to maintain tension in fabrication medium 34 on the left side of stack 66. The right-most holding roller 172 has been placed in a position above the right side of stack 66 in order to maintain tension in fabrication medium 34 to the right of lay-down platen 84.

FIG. 10C(b) shows another view of a similar arrangement. (In FIG. 10C(b), peel-off platen 88b is not shown for simplicity, lay-down platen 84 is shown in a raised position, and fabrication medium 34 is shown as fed over the left-most holding roller 172 instead of under it as in FIG. 10C(a).) In FIG. 10C(c), fabrication medium 34 has been entirely laid down. Both platens 84 and 88b are idle, and both holding rollers 172 are maintaining tension in fabrication medium 34 on either side of stack 66. In FIG. 10C(d), peel-off platen 88d is pressing up against the bottom surface of fabrication medium 34 in order to peel substrate 13 away from positive material 15 which has become adhered to stack 66 and become new layer 262. Any non-overlapping negative material 17c' on substrate 13 is separated from positive material 15 by substrate weeding. Removed negative material 17c' and substrate 13 together become waste sheet 34b.

Delayed Peel-Off with a Multi-Platen System

FIG. 10D shows a method of stacking in which upper lay-down platen 84c presses fabrication medium 34 onto stack 66 against resistance of lower lay-down platen 84d, while lower peel-off platen 88d pulls up substrate 13 from fabrication material 11 just laid down against resistance of upper peel-off platen 88c. The platens are shown as rollers, but other shapes may be used. The holding system includes a pair of stationary holding rollers 172 over which fabrication medium 34 passes and is connected to feed and take-up devices (not shown), but other means may be used.

Design of Platens

The terminology used here is as follows. The "face" of a platen is that portion of the surface of the platen which contacts a fabrication medium. The "shape" of a platen refers to the shape of the platen's face. A smooth surface may either be flat (have no curvature), singly curved (have single curvature), or doubly curved (have double curvature). This refers to the number of straight lines that can be drawn in a smooth surface through a point in the surface. If two different straight lines can be drawn through a point, then any line through the point is straight, and the surface is flat at that point. If only one straight line can be drawn through a point, then the surface is singly curved at that point, and the straight line is the axis of curvature at that point. If no straight lines can be drawn through a point, then the surface is doubly curved at that point.

A platen may have any of a variety of shapes. These are discussed here in three broad categories: constant single curvature, flexible curvature, and controlled curvature. A flat platen is not generally useful because (a) in lay-down, it may be prone to trapping air bubbles between the new fabrication material and the stack, and (b) in peel-off, it does not provide for a means to incrementally separate the substrate from the fabrication material. However, a flat platen may be used if it has controlled curvature, as discussed below. For fabrication in doubly curved layers, it may be necessary to use a fabrication medium that is capable of conforming to a doubly curved shape. In the jargon of the composites industry, this ability in a material is called "drape."

Platen with constant single curvature. A platen with single curvature is useful for fabricating objects in flat layers or in layers of single curvature. Examples of singly-curved platens include a cylindrical platen, or roller, as shown in FIG. 11A(a), an arc platen, which is a section of a cylinder and has a constant radius of curvature, as shown in FIG. 11A(b), a more general singly-curved shape, as shown in FIG. 11A(c), a bar platen, as shown in FIG. 11A(d), and a blade platen, whose face is just a pointed edge, as shown in FIG. 11A(e).

To allow for fabrication in singly curved layers, a cylindrical platen or roller (with radius smaller than the radius of curvature of the layers) may be mounted on a mechanism that allows it to be raised and lowered as it passes over the stack. This is shown in FIG. 11A(f), where axle 84a of roller 84 is driven up and down in tracks 72b while being driven back and forth in tracks 72a. If the axes of curvature at every point of stack 66 are horizontal, then platen 84 may remain horizontal as it is raised and lowered, so that both sides of platen 84 may be raised and lowered in unison. If, however, the axes of curvature are not everywhere horizontal, then each side of platen 84 must be capable of being raised and lowered independently to allow platen 84 to follow the curvature of stack 66.

FIG. 11B shows the use of a peel-off bar, which is a bar platen used for the same purpose as upper peel-off platen 88c in FIG. 10D. In FIG. 11B, there is no lower peel-off platen, and waste sheet 34b is fed directly from peel-off bar 88 to the holding device, which for purposes of illustration only in this figure is shown as take-up spool 86. The sequence of actions in FIG. 11B is such as would be carried out after fabrication medium 34 has been laid down by a separate lay-down platen system (not shown). In FIG. 11B(a), peel-off bar 88 is positioned over a negative region, so negative material 17 under peel-off bar 88 remains on substrate 13, In FIG. 11B(b), peel-off bar 88 has reached boundary cut 17a in fabrication material 11. Negative material 17 separates from positive material 15, becoming successfully weeded negative material 17c' and together with substrate 13 becoming waste sheet 34b, while positive material 15 remains adhered to stack 66 and becomes new layer 262. In FIG. 11B(c), substrate 13 is being peeled away from positive material 15 on stack 66. In FIG. 11B(d), peel-off bar 88 has reached another boundary cut 17a. Again the negative and positive material separate, with negative material 17 remaining on substrate 13.

The advantage of a bar platen is that it provides a very small radius of action, which can be helpful for certain types of fabrication material. An even smaller radius of action is obtained by using a blade platen (FIG. 11A(e)).

Platen with flexible curvature. For fabrication in doubly curved layers, a platen with flexible curvature is useful because the platen may conform passively to the curvature of the stack. Two examples are discussed here: a pillow platen and a sausage platen. A pillow platen may be useful for fabrication in layers with mild, double curvature. A sausage platen may be able to operate on stacks of more gross curvature.

A pillow platen is a holding platen with flexible double curvature. It is like a pillow because (a) left alone, it's face has a gentle double curvature with simple symmetry, but (b) it's face is capable of taking on any sort of complicated curvature in response to forces applied to the face. This allows such a platen to be used to apply fabrication material to layers of complicated curvature because as the platen presses the material against the stack, the face of the platen and the material mounted on it can conform to the shape of the stack, allowing each part of the fabrication material to contact the correct point of the stack. Since the platen conforms to the shape of the stack in stages, it allows air to be pushed out of the way in the process instead of becoming trapped between the fabrication material and the stack. After the fabrication material has conformed to the shape of the stack and become adhered to it, the platen is pulled away from the stack. As the platen is pulled away, the substrate separates from the fabrication material. The portions of the fabrication material which were the last to come into contact with the stack are the first to be separated from the substrate.

The flexibility of a pillow platen may arise from being made of a flexible material, such as rubber, foam, or sponge, or the face of the platen may be a thin, stretchable material filled with such a flexible material or filled with a fluid, such as water, oil, or air. If the platen is filled with a fluid, one could adjust its flexibility by controlling the fluid pressure of the fluid.

The use of a pillow platen is illustrated in FIG. 11C. FIG. 11-C(a) shows fabrication medium 34 being fed to platen 480. In FIG. 11C(b) fabrication medium 34 is mounted to the face of platen 480 and held to the face by a holding means, which for the purposes of illustration only is shown here as a set of clamps 89. Opposite the face of platen 480 is shown stacker base 64, whose shape is used to establish the shape of the first layer of the object to be built. When platen 480 is moved towards base 64 and fabrication medium 34 contacts base 64, the face of platen 480 and fabrication medium 34 together conform to the shape of base 64 and fabrication material 11 becomes adhered to the base 64. (This adhesion is releasable, as is discussed under Holding the first layer.) Then platen 480 is moved in the opposite direction to pull it away from base 64, whereupon substrate 13 is incrementally separated from fabrication material 11. FIG. 11C(c) shows a result of several repetitions of this procedure. In FIG. 11C(c), the curvature of the layers is seen to vary from layer to layer. Methods for accomplishing this are discussed under Methods of Varying Curvature of Layers. If the layers are formed on the substrate either in a flat configuration or with a curvature which is different from the final curvature which they will assume on the stack, then the thickness of the layers as formed can be adjusted for the changes that will take place in the curvature as discussed under Accommodating thickness of layers to changes in curvature.

A sausage platen consists of chain of roller segments 682 joined together by linkages 684, as shown in FIG. 11D(a). A sausage platen can roll over a surface of complex curvature, pressing down uniformly on a major portion of the surface area. The downward force of a roller segment may be provided by its weight, by a set of push-rods 688 (as shown in FIG. 11D(b)) connected to the roller segment by yokes 686, or by another appropriate means.

Platen with controlled curvature. A platen may be provided with means to vary the curvature of its face under computer control. This allows forces to be selectively applied to portions of a fabrication medium mounted on it. The forces applied may be either to push the fabrication medium against the stack during lay-down, or to pull the substrate away from the stack for peel-off. The idea is to use controlled changes in the curvature of the platen face either (a) to push on the fabrication medium in different parts separately in order to selectively "roll" on the fabrication material, and/or (b) to pull on the substrate in different parts separately in order to selectively peel off the substrate.

Controlling the curvature of a platen face can be implemented in a platen of any starting shape, and consists of inducing changes in that starting shape. The ability to do this generally requires that (a) the platen face be constructed of a flexible, stretchable material, and (b) there is mounted under the face material a mechanism for applying forces to the face material to control its shape. The mechanism for applying the forces may consist of rollers, pins, or other elements to convey the forces. FIG. 11E shows flat platen 580 with controlled curvature implemented by roller 584 moving beneath its face 382. FIG. 11E(a) is a cross section, while FIG. 11E(b) shows platen 580 in full-face view. FIG. 11E(a) and FIG. 11E(b) show platen 580 with roller 584 in its "rest" position, where it does not affect the curvature of face 382. FIG. 11E(c) shows platen 580 in cross-section with roller 584 in a position where it is imposing curvature on a portion of platen face 382, and is therefore pushing on the corresponding portion of fabrication medium 34.

An application of the ability to control the curvature of a platen face arbitrarily is in building an object that has cantilevers or overhangs extending in all directions. Overhangs cause a problem for removal of the substrate because the substrate cannot be removed by lifting in a direction that first raises the overhanging material. For overhangs that go all the way around an object, this means that the substrate has to be removed by lifting first in the interior of the object and pulling towards the outside. This is best done with a platen whose face curvature can be modified under computer control. (An alternative solution to this problem is to use support structures that fill in part of the space under the overhang.)

Design of holding system for a holding platen. A fabrication medium may be held to a platen by various means. The requirements of the holding means are that (a) it holds the fabrication medium securely to the platen without wrinkling or buckling and without allowing air to be trapped between the substrate and the platen, and (b) it is easily releasable. Three examples are shown in FIG. 12, although others may also be used. One example is the use of clamps 89 at opposite edges of fabrication medium 34, as shown in cross section for arc platen 85 in FIG. 12(a), for arc platen 85 with a full-face view of the platen in FIG. 12(c), and in cross section for cylindrical platen 84 in FIG. 12(h). FIG. 12(b) shows a possible mechanism for operating clamps 89. When solenoid 282 is energized, it pulls solenoid pin 282b into solenoid body 282a against the force of spring 282c, thereby pulling clamp 89 against fabrication medium 34. Another example is the use of a series of edge-holding rollers 74 along opposite edges of fabrication medium 34, as shown in cross section in FIG. 12(d) and with a full-face view of the platen 85 in FIG. 12(e). Still another example is the use of vacuum suction, as shown in cross section in FIG. 12(f) and with a full-face view of platen 85 in FIG. 12(g). In FIG. 12(f), the small arrows indicate the force of suction acting on fabrication sheet 34 due to an array of tiny vacuum holes along the surface of platen 85. In FIG. 12(g), the array of holes is indicated by dots, which are shown in the figure but are actually hidden beneath fabrication medium 34.

FIG. 10A and FIG. 10B also show the use of clamps 89 at opposite edges of the fabrication medium, but this is only for purposes of illustration. Other means, or a combination of means, may be substituted in these figures without affecting their meaning.

When mounting fabrication medium 34 to cylindrical platen 84 (roller), it will generally be advisable to slice fabrication medium 34 into segments 34a. When using an arc platen 85, however, one may slice fabrication medium 34 into segments or one may hold to platen 85 sections of a long, continuous sheet.

When the holding means involves clamps 89, one or more of clamps 89 may be mounted in a track 284 which allows the clamp 89 so mounted to be repositioned for use with a shorter segment 34a of fabrication medium or with a shorter section of a long, continuous sheet of fabrication medium 34. This is shown in cross-section for cylindrical platen 84 in FIG. 12(i), in cross-section for arc platen 85 in FIG. 12(j), and for arc platen 85 with a full-face view of the platen in FIG. 12(k). In FIG. 12(i), FIG. 12(j), FIG. 12(k), the dotted lines represent alternative positions of the repositionable member of the set of clamps 89.

FIG. 12(l) shows a variation on the use of clamps 89 with cylindrical platen 84, in which there is only one clamp 89. Segment 34a of fabrication medium is wrapped completely around roller 84 and overlaps on itself so that two edges may both be clamped by the single clamp 89. This technique may be used for concurrent peel-off, but not for consequent peel-off because it does not allow holding means 89 to be released at one edge of segment 34a while remaining engaged elsewhere. This technique also requires that segment 34a be long enough to sufficiently exceed the circumference of roller 84.

FIG. 10E shows a variation in which a single clamp 89 is used to hold one edge of segment 34a of fabrication medium, while the other end of segment 34a is left free.

Brief Description of an Example Carried-Sheet Fabricator with Endless-Belt Substrate In FIG. 13, an alternate embodiment of this invention is shown where the substrate 13 consists of sections of an endless conveyer belt 33. In this embodiment, a roll 32 of fabrication material 11 advances to engage the surface of the belt 33 which carries the fabrication material between knife blade 45 and base 44. The blade 45 cuts through the fabrication material 11 to form on the substrate 33 a positive region and a negative region of the material. The belt then conveys the material 11 to stack 66 where the positive material is removed and adhered to stack 66. The endless belt 33 continues to carry the negative material on its surface and advances this negative material to a stripper 49 which is a blade which scrapes along the surface of the substrate to remove the negative material. The embodiment depicted in FIG. 13 provides for continuous use of the substrate.

Brief Description of an Example Carried-Sheet Fabricator with Continuous Take-Up of Scrap In FIG. 14, an embodiment of this invention is shown where fabrication material 34 is supplied on roll 32 of long, continuous sheet and is not sliced into segments. As each section of fabrication medium 34 is transformed into waste sheet 34b by the removal of positive material 15 therefrom and the attachment of the positive material on stack 66, said waste sheet 34b is wound up on take-up spool 86. For this to work, a region of fabrication medium slack 34c must be created between formation station 40 and stacker 60 so that fabrication medium 34 may undergo independent motions and have different tensions in formation station 40 and in stacker 60. The proper slack 34c is maintained by feed rollers 39.

Brief Description of an Example Additive Conveyed-Adherent Fabricator

In FIG. 15, an alternate embodiment of this invention is depicted which is similar to that shown in FIG. 13. The principal difference is that the additive version of the method is employed where material is selectively deposited on the belt 33. A suitable deposition material is, for example, a hardenable paste or gel. In accordance with this embodiment, the material is deposited as a layer with precise, predetermined boundaries so that no negative material is present on the substrate. A suitable deposition device 45a may be a drop-on-demand ink jet as used in the Hewlett-Packard DeskJet printer, or a continuous-mode ink jet as used in the Soligen DSP fabricator.

One of the important features of this invention is the use of successive carrier substrates 13 to convey fabrication layers. The same substrate, however, may be repeatedly reused and moved reciprocally between the formation station and the stacker, or the substrate may be discarded after each use. Each is considered successive carrier substrates.

Scope of the Invention

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed. On the contrary, the intention is to cover all modifications and alternate constructions coming within the spirit and scope of the invention as generally expressed by the following claims, which particularly point out and distinctly claim the subject matter of the invention:

What is claimed is:

1. Apparatus for selectively removing sheet material from a carrier substrate, including a formation station where the sheet material on the carrier substrate is divided into a negative region of waste material and a positive region corresponding to a predetermined configuration, and a weeder mechanism which selectively removes the negative region of waste material from the carrier substrate, said weeder mechanism including a barb element that selectively engages and retains a negative region of waste material until said retained negative region of waste material is removed from the barb element.

2. Apparatus for fabricating a three-dimensional object from individual layers of fabrication material having a predetermined configuration, where successive layers are stacked in a predetermined sequence and affixed together to form said object, said apparatus including a formation station where successive, individual fabrication layers are formed on successive carrier substrates, said individual fabrication layers being divided into a negative region of waste material and a positive region corresponding to the configuration of one individual layer, a stacking station where the successive, individual fabrication layers are stacked together to form a stack, a conveyor for conveying the successive, individual fabrication layers on said successive carrier substrates from said formation station to said stacking station, a separator which separates each successive carrier substrate from the fabrication layer thereon to expose a bonding surface on each individual fabrication layer, a weeder mechanism in advance of the stacking station which selectively removes the negative region of waste material from the fabrication layers, said weeder mechanism including a roller device that retains thereon the substrate, and any negative region adhering thereto, to expose an internal surface of the individual fabrication material being deposited so that a successive fabrication layer may be bonded thereto, and an affixing mechanism which brings an individual fabrication layer into contact with the stack, so that the layer becomes affixed to the stack.

3. Apparatus for fabricating a three-dimensional object from individual layers of fabrication material where successive layers are stacked in a predetermined sequence and affixed together to form said object, said apparatus including a continuous roll of carrier substrate having thereon a continuous layer of fabrication material, a formation station where successive, individual fabrication layers are formed on the carrier substrate by dividing successive segments of the continuous layer of fabrication material into a negative region of waste material and a positive region corresponding to the configuration of one individual layer, a stacking station where the positive regions of the successive segments of the continuous fabrication layer are sequentially stacked to form the object, a conveyor for conveying -the successive segments formed at the formation station to said stacking station on the continuous carrier substrate, an affixing and separating mechanism which affixes said positive region to a stack of layers at the stacking station and separates the positive region of each successive segment from the carrier substrate, and a weeder mechanism that selectively removes any negative region of waste material from the fabrication layers including a roller device that retains thereon the substrate, and any negative region adhering thereto, to expose an internal surface of the individual fabrication material being deposited so that a successive fabrication layer may be bonded thereto.

4. The apparatus of claim 3 where a portion of said continuous carrier substrate between said formation station and said stacking station is maintained by said conveyor in a slack state.

5. Apparatus for fabricating a three-dimensional object, including a formation station providing a sheet material including a carrier substrate and a fabrication material formed into a predetermined configuration on the carrier substrate, a stacking station at which a series of successive, individual layers of fabrication material are formed into a stack, a weeder mechanism in advance of the stacking station which selectively removes any negative region of waste material from the layers, said weeder mechanism including a roller device that retains thereon the substrate, and any negative region adhering thereto, to expose an internal surface of the individual fabrication material being deposited so that a successive fabrication layer may be bonded thereto, and an affixing and separating mechanism at said stacking station which affixes the fabrication material on the substrate to the stack and then separates the carrier substrate from the individual fabrication layer affixed to the stack, said affixing and separating mechanism including a platen device about which the sheet material is wrapped, said platen device being moved along a path adjacent the stack, bearing against the stack to deposit the fabrication material onto the stack, said platen device as it moves along said path retaining on said platen device the substrate.

6. Apparatus for fabricating a three-dimensional object from a flexible sheet member comprising a substrate and a fabrication material having an exterior surface and an internal surface carrying an adhesive which bonds the fabrication material to the substrate but allows the substrate to be removed to expose the adhesive upon separation of the substrate from the fabrication material, said apparatus including a stacking station at which a series of successive, individual layers of fabrication material are formed into a stack, a cutter in advance of the stacking station which partially severs the sheet member, cutting through the fabrication material but not the substrate to form on the substrate a positive region corresponding to a predetermined configuration for an individual layer of fabrication material and a negative region of waste material, and an affixing and separating mechanism at said stacking station which receives the sheet material from the cutter and separates each successive carrier substrate from the individual fabrication layer thereon to expose said adhesive on said internal surface of the individual fabrication layer, said affixing and separating mechanism including a roller device about which the sheet material is wrapped, said roller device being moved along a path adjacent a previously stacked fabrication layer which has its adhesive bearing, internal surface exposed, bearing against the previously stacked fabrication layer to deposit the fabrication material carried by the roller device on said exposed, adhesive bearing, internal surface of said previously stacked fabrication layer, with the adhesive on said internal surface of said previously stacked fabrication layer bonding to said exterior surface of the individual fabrication material, said roller device as it moves along said path retains on said roller device the substrate, and any negative region adhering thereto, to expose the internal surface of the individual fabrication material being deposited so that a successive fabrication layer may be bonded thereto.

7. The apparatus of claim 3 where the roller device is first moved in one direction to deposit the sheet material, including both the substrate and the individual fabrication layer thereon, on the previously stacked fabrication layer, and then moves in an opposite direction to separate the substrate and any negative region of waste material thereon from the deposited fabrication layer.

8. Apparatus for fabricating a three-dimensional object from a flexible sheet member comprising a substrate and a fabrication material having an exterior surface and an internal surface carrying an adhesive which bonds the fabrication material to the substrate but allows the substrate to be removed to expose the adhesive upon separation of the substrate from the fabrication material, said apparatus including
  a stacking station at which a series of successive, individual layers of fabrication material are stacked in a predetermined sequence and affixed together to form a stack,
  a cutter in advance of the stacking station which partially severs the sheet member, cutting through the fabrication material but not the substrate to form on the substrate a positive region corresponding to a predetermined configuration for an individual layer of fabrication material and a negative region of waste material,
  a conveyor for conveying in said predetermined sequence partially severed sheet members to said stacking station, and
  an affixing and separating mechanism at said stacking station which separates each successive carrier substrate from the individual fabrication layer thereon to expose said adhesive on said internal surface of the individual fabrication layer,
  said affixing and separating mechanism including a roller device which is moved along a path adjacent the stack,
  said roller device bearing against the sheet member so that the exterior surface of the fabrication material contacts said exposed adhesive, bonding to said stack,
  said roller device as it moves along said path pulling the substrate, and any negative region adhering thereto, from the individual layer to expose its internal surface so that successive fabrication layers may be bonded thereto,
  said roller device being moved in a sequence so that said exterior surface of said individual fabrication layer is bonded to the stack prior to separation of the substrate from said individual fabrication layer.

9. The apparatus of claim 8 where the roller device moves first to bond selectively the individual fabrication material to the stack and moves again to pull the substrate, and any negative region adhering thereto, from said individual fabrication layer bonded to the stack.

10. The apparatus of claim 8 where the roller device includes a set of spaced apart parallel rollers.

11. The apparatus of claim 10 where one of the rollers includes a gripper mechanism which grips an edge of the sheet member and pulls the substrate, and any negative region adhering thereto, from the stack.

12. The apparatus of claim 8 including a waste material removing mechanism which removes, at least partially, the negative region of fabrication material from the substrate prior to the affixation of the layers.

13. Apparatus for fabricating a three-dimensional object from a fabrication material held to a substrate in a way that allows the substrate to be separated from the fabrication material when successive layers of fabrication material are affixed together, said apparatus including
  a stacking station at which a series of successive, individual layers of fabrication material are stacked in a predetermined sequence and affixed together to form a stack,
  each of said successive fabrication layers being formed on the substrate as an individual layer comprising a positive region corresponding to a predetermined configuration for an individual layer of fabrication material and a negative region of waste material, said negative region including and interfering negative region and a non-interfering negative region,
  a cutter which cuts through the fabrication material but not the substrate to form the positive and negative regions,
  a fabrication material removal mechanism in advance of the stacking station which selectively removes substantially all of said interfering negative region from the substrate prior to stacking of said individual fabrication layers,
  a conveyor for conveying in said predetermined sequence the successive, individual fabrication layers on one or more carrier substrates to said stacking station,
  an affixing mechanism which brings a bonding surface of the stack into contact with the fabrication layer, so that the layer becomes affixed to the stack, and
  a separator which separates from the fabrication layers each successive, individual carrier substrate with any remaining non-interfering negative region remaining thereon after affixation of the previous individual fabrication layer to the next successive fabrication layer.

14. The apparatus of claim 13 including a gripper mechanism which grips an edge of a substrate and pulls the substrate, and any negative region adhering thereto, from stacked layers affixed together.

15. Apparatus for fabricating a three-dimensional object from a sheet material, said apparatus including
- a dividing station at which successive segments of sheet material on a flexible substrate material are divided into regions of positive material comprising the sheet material that is to be part of the said object and regions of negative material comprising the sheet material that is not to be part of the said object,
- a stacking station at which a succession of such divided segments of sheet material is stacked in a predetermined sequence and affixed together to form said object,
- a conveyor that moves the substrate material with divided segments of sheet material thereon to said stacking station,
- an affixing and separating mechanism at said stacking station which (i) brings each new segment of sheet material in the said sequence into contact with a surface of the stack of previous segments of sheet material so that the said new segment becomes affixed to the stack, and (ii) separates the substrate material from the said new segment of sheet material thereon by incrementally pulling the substrate material from the sheet material.

16. The apparatus of claim 15, where the sheet material includes an adhesive component.

17. The apparatus of claim 16, where the adhesive component is substantially mixed in with the rest of the sheet material.

18. The apparatus of claim 16, where the adhesive component is a coating on the rest of the sheet material.

19. The apparatus of claim 15, including a bond-inducing mechanism that performs an operation which causes or enhances bonding of each new segment of sheet material to the said surface of the stack.

20. The apparatus of claim 19, where the bond-inducing mechanism operates substantially uniformly on all parts of each new segment of sheet material.

21. The apparatus of claim 19, where the bond-inducing mechanism operates only on geometrically selected portions of each new segment of sheet material.

22. The apparatus of claim 15, where the dividing station includes a cutting mechanism that cuts through the sheet material without cutting through the substrate material.

23. The apparatus of claim 15, including a weeding station between the dividing and stacking stations, which weeding station removes selected portions of negative material from the substrate material prior to the stacking of each new segment of sheet material.

* * * * *